US007346539B1

(12) United States Patent
Atkinson et al.

(10) Patent No.: US 7,346,539 B1
(45) Date of Patent: Mar. 18, 2008

(54) SYSTEM AND METHOD FOR INTERPRETING MARKET FORCES AND DEVELOPING STRATEGIC BUSINESS DIRECTIONS

(75) Inventors: Cort Atkinson, Atlanta, GA (US); Laurie L. Cullen, Atlanta, GA (US); Patricia Carol Hammock, Marietta, GA (US); Mario Muth, Norcross, GA (US); George Ronald Reardon, Lawrenceville, GA (US); Henry Ulf Magnus Stark, Atlanta, GA (US)

(73) Assignee: AT&T Delaware Intellectual Property, Inc., Wilmington, DE (US)

( * ) Notice: Subject to any disclaimer, the term of this patent is extended or adjusted under 35 U.S.C. 154(b) by 1104 days.

(21) Appl. No.: 10/279,835

(22) Filed: Oct. 25, 2002
(Under 37 CFR 1.47)

Related U.S. Application Data

(60) Provisional application No. 60/330,656, filed on Oct. 26, 2001.

(51) Int. Cl.
 G06F 17/30 (2006.01)
 G06F 13/00 (2006.01)
(52) U.S. Cl. ........................ 705/10; 709/200
(58) Field of Classification Search ............... None
 See application file for complete search history.

(56) References Cited

U.S. PATENT DOCUMENTS

| 5,640,505 | A  | * | 6/1997  | Hearn et al. ............... 714/4 |
| 6,917,816 | B2 | * | 7/2005  | Abed et al. ............. 455/556.1 |
| 6,996,387 | B2 | * | 2/2006  | Chan .......................... 455/301 |
| 7,106,850 | B2 | * | 9/2006  | Campbell et al. ...... 379/265.09 |
| 7,149,698 | B2 | * | 12/2006 | Guheen et al. ............... 705/1 |
| 7,162,427 | B1 | * | 1/2007  | Myrick et al. ............... 705/1 |
| 2002/0052754 | A1 | * | 5/2002  | Joyce et al. ................ 705/1 |
| 2002/0107947 | A1 | * | 8/2002  | Moragne et al. ........... 709/223 |
| 2003/0078962 | A1 | * | 4/2003  | Fabbricatore et al. ...... 709/203 |

(Continued)

FOREIGN PATENT DOCUMENTS

WO WO 200008565 A * 2/2000

OTHER PUBLICATIONS

Wang et al. "ICEBERG: An Internet-core Network Architecture for Integrated Communications", IEEE Personal Communications, 2000, 12 pages.*

(Continued)

*Primary Examiner*—Beth Van Doren
*Assistant Examiner*—Dave Robertson
(74) *Attorney, Agent, or Firm*—Withers & Keys LLC

(57) ABSTRACT

Systems and methods for creating new communications services are disclosed. One embodiment of the invention is a method for developing an application strategy, which can be used to develop a new communications service of the invention. The method includes the steps of analyzing limitations of an existing communications network, interpreting market forces associated with the communications network, understanding customer needs in using the communications network, and defining an application strategy to meet the customer needs. The method includes an analysis of interactions among communications networks, communications applications, and communications devices. Preferably, two or more communications networks are included to provide the communications service. The communication service can be one of a SMART Search Service, a SMART Share Service, a SMART Store Service, a SMART Wait Service, a SMART Filter Service, a SMART Communications Service, a SMART Wireless LAN Service, a SMART Access Service, and SMART Gateway Service.

4 Claims, 21 Drawing Sheets

U.S. PATENT DOCUMENTS

2003/0172145 A1* 9/2003 Nguyen .................. 709/223
2007/0265907 A1* 11/2007 Adduci et al. ............. 705/10

OTHER PUBLICATIONS

Decina, M. and Trecordi, V. "Convergence of telecommunications and computing to networking models for integrated services and applications," in Proceedings of the IEEE, Dec. 1997, vol. 85, No. 12, pp. 1887-1914.*

Messerschmitt, D.G. "The convergence of telecommunications and computing: what are theimplicationss today?" in Proceedings of the IEEE, Aug. 1996, vol. 84, No. 8, pp. 1167-1186.*

Vrdoljak, M. Vrdoljak, S.I. and Skugor, G. "Fixed-mobile convergence strategy: technologies and market opportunities Communications Magazine," in IEEE Communications Magazine, vol. 8, Issue 2, Feb. 2000, pp. 116-121.*

\* cited by examiner

| Company | ACCESS | STORE | SHARE | SEARCH | NO WAIT EXPERIENCE | FILTER | COMMUNICATION |
|---|---|---|---|---|---|---|---|
| iPAQ | X | | X | | | | |
| SkyGo | X | | X | | | X | |
| Delta Air Lines | X | | | | X | X | |
| Continental Airlines | X | | | | | | |
| Motorola | | | | | | X | |
| Intel | X | | | | | | |
| Endeavor Technologies | X | | X | | | | |
| Softwired | X | | | | | | |
| Hapax | | | | X | | | |
| ActiveBuddy | | | | | X | | |
| Columbitech | X | | | | | | |
| Broadcom Corporation | X | | | | | | |
| Anycom Inc. | X | | | | | | |
| Tegic Communications | | | X | | | | |
| Milennial Net | X | | | | | | |
| Enron | X | | | | | | |
| Apigent Solutions | | | | | X | | |
| Incentive Systems | | | | | X | | |
| WorldStreet Corp | | | | | | X | |
| Cisco, Network Appliance, Pirus Networks, IBM Nishan Systems | | X | | | | | |
| Groove Networks | | | X | | | | |
| Oculus Technologies | | | X | | | | |
| Next Page | | | X | | | | |
| Autonomy | | | | X | | | |
| Cahoots | | | X | | | | |

FIG. 3

SYSTEM AND METHOD FOR INTERPRETING MARKET FORCES AND DEVELOPING STRATEGIC BUSINESS DIRECTIONS

This application claims the benefit of U.S. Provisional Application No. 60/330,656 filed Oct. 26, 2001, which is herein incorporated by reference in its entirety.

FIELD OF THE INVENTION

The invention relates generally to the field of business development and, more particularly, to systems and methods that interpret market forces and develop strategic business directions.

BACKGROUND OF THE INVENTION

Communications service providers operate different types of communications networks to provide a large number of different communications services to their customers. The communications services are enjoyed by the customers who use different communications devices. For example, a first customer may use a wireless telephone to initiate and receive telephone calls via a wireless telephone network, and a second customer may use a laptop to obtain information from the Internet via a broadband network.

As technologies related to communications continue to be invented, discovered, or improved upon, new or improved communications devices, applications, and networks are being introduced to the market at a fast rate. Parallel to this phenomenon is an increased consumer expectation of the communications services to which they subscribe, and a fierce competition among communications service providers to win a larger market share. As a result, the communications landscape is constantly changing. Among other things, communications service providers are forming alliances among themselves to stay competitive and to provide desirable communications services to their customers. Customers are expecting ubiquity, simplicity, minimal behavior change and attractive prices from their communications services.

Accordingly, communications service providers are in need of a system and method that can help interpret market forces and develop strategic business directions.

SUMMARY OF THE INVENTION

The present invention includes systems and methods for creating new communications services. One embodiment of the invention is a method for developing an application strategy. The method includes the following steps. First, limitations of existing communications networks are analyzed. Second, market forces associated with the communications networks are interpreted. Third, customer needs in using the communications networks are understood. Fourth, an application strategy is defined to meet the customer needs. The method includes an analysis of interactions among communications networks, communications applications, and communications devices.

Preferably, the method also include one or more of the following steps. Fifth, advantages and disadvantages associated with the communications networks are understood. Sixth, capabilities of additional communications networks which are not analyzed in the analyzing step are understood. Seventh, each of the communications networks is evaluated to determine whether it is a potential business partner. Preferably, this step includes a discovery of core functions most desired by customers of the communications networks. Eighth, the interactions among communications networks, applications, and devices are understood. Ninth, characteristics of communications services most desired by the customers are understood. Tenth, a communications service is created to meet the customer needs.

Preferably, two or more communications networks are included to provide the communications service. The communication service can be one of a SMART Search Service, a SMART Share Service, a SMART Store Service, a SMART Wait Service, a SMART Filter Service, a SMART Communications Service, a SMART Wireless LAN Service, a SMART Access Service, and SMART Gateway Service. SMART is an acronym that means simple, manageable, accessible, reliable, and trusted. Through the SMART Store Service, an intelligent "save" feature automatically archives a customer's information in a secure network storage space. Through the SMART Share Service, immediate access and sharing of any stored information can be provided to anyone using any networked device. Through the SMART Search Service, a research engine is tailored to the user's experience and/or knowledge level. The research engine intelligently determines what is derived in the search by linguistic analyzing and/or historical remembrance.

Another embodiment of the invention is a method for creating new communications services, such as those listed above. The method includes the following steps. First, interactions among communications networks, communications applications, and communications device are analyzed. Second, customer desires associated with core functions are understood. The core functions preferably include store, share, and search. Third, a communications service based on results of the analyzing and understanding steps is created.

Preferably, the analyzing step includes an analysis of an access area overlapped by the communications networks and the communications devices, a make area overlapped by the communications devices and the communications applications, and/or an experience area overlapped by the communications applications and the communications networks. In addition, the analyzing step preferably includes an analysis of a core function area overlapped by the communications networks, communications devices, and communications applications.

Another embodiment of the invention is a system for providing communications services. The system includes communications devices operable by users of the system. The system also includes one or more communications networks associated with the communications devices. The communications networks preferably provide a communications service that can be enjoyed by users of the communications devices. In addition, the system includes one or more computer networks accessible to the users via the communications networks. Preferably, each of the computer networks includes a database or storage. The communications service involves storing, sharing, and searching contents of the database or storage.

The system preferably further includes a gateway interface. The gateway interface preferably includes a database or storage having profiles associated with the users. In addition, the gateway interface preferably includes one or both of a protocol server and a transaction server. The communications service is one of a SMART Search Service, a SMART Share Service, a SMART Store Service, a SMART Wait Service, a SMART Filter Service, a SMART Communications Service, a SMART Wireless LAN Service, a SMART Access Service, and SMART Gateway Service.

BRIEF DESCRIPTION OF THE DRAWINGS

FIG. 3 is an exemplary chart indicating characteristics of companies that provide communications services.

DETAILED DESCRIPTION OF THE INVENTION

In addition to end users of the invention, an exemplary business enterprise that can benefit from the invention is a communications service provider. For example, a Regional Bell Operating Company (RBOC) may adopt one or more embodiments of the invention to develop new communications services for its customers. The invention can be adapted to be implemented or used by business enterprises other than communications service providers.

One embodiment of the invention is a method for interpreting market forces faced by a communications service provider. Another embodiment of the invention is a method for defining business directions for the communications service provider. Still another embodiment of the invention includes both the interpretation of market forces and the definition of business directions in response to the market forces faced by the communications service provider. Defining business directions can include introduction of one or more of the following new communications services by the communications service provider: SMART Store Service, SMART Share Service, SMART Search Service, SMART Wait Service, SMART Filter Service, SMART Communications Service, SMART Wireless Local Area Network (LAN) Service, SMART Access Service, and SMART Gateway Service. Each of the new communications services is described below.

PREFERRED EMBODIMENTS

Figure 1:
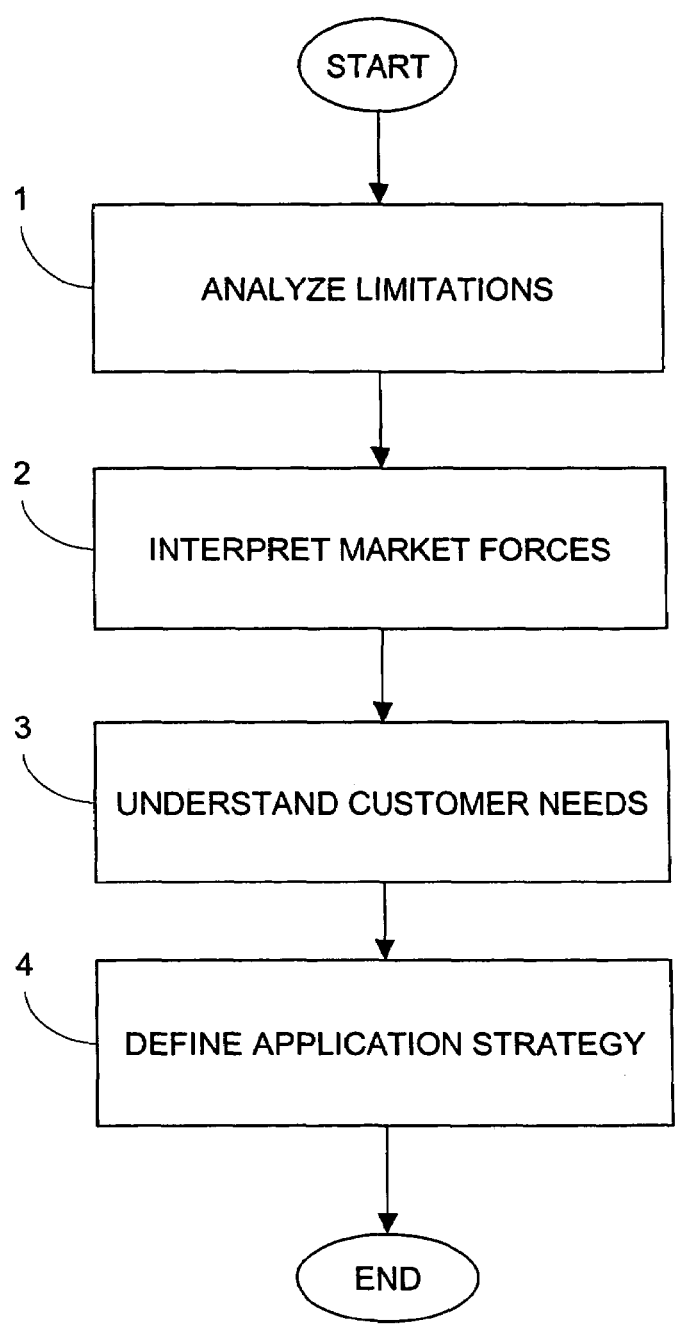
FIG. 1 is a flowchart showing exemplary steps that can be used to implement a preferred embodiment of the invention.

A preferred embodiment of the invention includes four general steps, which are shown as a flowchart in FIG. 1. Following a general description of these general steps, each of the four steps is explained in greater details.

The first general step, step 1, involves an analysis of limitations associated with a communications network (or networks) operated by the communications service provider. Preferably, the analysis includes an understanding of advantages and disadvantages associated with the communications network. For example, the communications network's capabilities, e.g., the speed at which information is transferred and the convenience to the consumers, and expected changes in those limitations over time, should be well understood.

The next general step, step 2, involves an interpretation of market forces surrounding the communications network. This includes an understanding of the capabilities of competing communications networks operated by other communications service providers. Data regarding each of these competing communications networks should be interpreted. For example, it should be determined whether any of the competing communications service providers can be a potential business partner.

The next general step, step 3, involves an understanding of customers' needs. This includes the discovery of core functions most desired by the customers. Preferably, this step also includes an understanding of how communications networks, communications applications, and communications devices interact. In addition, this step should determine which characteristics of communications services are most desired by the customers.

The final general step, step 4, involves a definition of business directions or application strategies. This include a creation of a new communications service or application through which the customers can use to execute one or more of the core functions most desired by them. This step preferably includes the step of combining two or communications networks to provide one new communications service.

Step 1: Analyzing Limitations

Not one communications network can satisfy all needs of its customers. As known in the art, a consumer of communications services can be a customer of more than one communications networks, which may be operated by more than one communications service providers. For example, a customer may use a wireless telephone for voice communications and a personal computer (PC) to access the Internet. Thus, this customer is served by a wireless telephone network and another communications network that provides access to the Internet. The other communications network may be a PSTN, a broadband network, or the like.

With increasing demand for communications services, the number of communications networks is growing exponentially. Regardless of what type of devices and which networks, almost all customers have the same demand. They want speed, convenience, and mobility. Each of the networks can be differentiated based on the speed of access, bandwidth, mobility, and whether communications are two-way or broadcast in nature.

As shown in Table 1 below, not one single network can provide speed, bandwidth, and mobility.

TABLE 1

Characteristics of Various Communications Networks

| Network | Speed | Bandwidth | Mobility | Two Way | Broadcast |
|---|---|---|---|---|---|
| Broadband-Wireline | Yes | Yes | No | Yes | No |
| Broadband-Cable | Yes | Yes | No | Yes | Yes |
| Wireless LAN (Wi-Fi) | No | Yes | Premises | Yes | No |
| Mobile Wireless | No | No | Yes | Yes | No |
| Satellite | Yes | Yes | No | No | Yes |

As indicated in Table 1 above, not one network can provide both two-way and broadcast capabilities at desirable speed, bandwidth, and mobility to its customers. Due to such limitation, a platform for multi-network interoperability is required to provide the desired communications services. With a thorough analysis of the limitations, a desirable combination of various communications networks can be achieved to provide the services most desired by the customers. Preferably, the winning combination provides one or more communications services that can be implemented to allow mobility in the very near future, as opposed to five to ten years out.

Step 2: Interpreting Market Forces

Existing networks, devices, and applications are evaluated so that their capabilities are well understood. Preferably, the networks, devices, and applications are evaluated to determine whether they can be incorporated or combined to provide a new communications service of the invention, which will be described in greater details below.

Table 2 below lists exemplary networks, devices, and applications currently available on the market.

TABLE 2

Exemplary Potential Consortium or Partner Considerations

| Network Operators | Device Makers | Application Suppliers |
|---|---|---|
| SBC | Sony | HAPAX |
| Cingular | Ericsson | Endeavor Technologies |
| Cox | Samsung | Tegic Communications |
| | Motorola | Active Buddy |
| | RIM | Telcordia |
| | Intel | |

Desirable devices for use in the invention preferably include those which are manufactured by companies with solid new product introduction process. For example, the companies with proven ability to obtain 10% or greater market share would be considered as preferred business partners or otherwise included in a consortium that provides a new communications service of the invention. In addition, the desirable companies preferably include those with demonstrated ability to predict mass market adoption probability based on early adopters response to device introduction. Development of the desirable devices preferably focuses on bringing multiple types of networks connected devices to the mass market which greatly enhances the customers' current experience with minimal behavior change. Moreover, the companies are preferably able to produce good quality devices that are priced right for mass adoption.

Providers of desirable communications applications preferably include those with proven ability to build scalable core engines, which supports multiple applications across industries. The applications providers preferably have proven ability to build intelligent "push button simplistic" applications, which are adaptable for multiple devices. Companies that understand consumer core behavior and have begun developing interoperability standards are among those that are most desirable.

Table 3 below lists exemplary companies that may be considered as a core provider or a key provider of devices, networks, or applications for inclusion in a communications service of the invention.

TABLE 3

Potential Players

| Company | Device | Network | Application | Content |
|---|---|---|---|---|
| AOL | Partner | Core | Partner | Core |
| Disney | | | | Core |
| Sony | Core | | Partner | Core |
| Matsushita | Core | | | |
| Samsung | Core | | | |
| Microsoft | Partner | Partner | Core | Partner |
| Oracle | | | Core | |
| Computer Associates | | | Core | |
| BellSouth | | Core | Partner | |
| SBC | | Core | Core | Partner |
| Verizon | | Core | | |

Step 3: Understanding Customer Needs

Many customers of communications service providers have this desire: "I can easily get what I want, from where I am, using what I have, and share it." What these customers have in mind is a communications service that enables them to manage information over various computer and communications networks. They want communications devices that are easy to use so that they do not have to be concerned with applications and networks associated with the devices. In other words, these users do not identify with the applications or the networks associated with the devices, instead, they only identify with the devices that they use. Above all, these customers want their devices to perform three core functions. They want to use the devices to enable them to search, share, and store information or content over computer networks through communications networks.

An analysis of what customers do when they are connected revealed three core functions that customers use the most. The core functions are "search," "share," and "store." When a customer is connected to a computer network using his or her device via the associated communications network, the customer most frequently performs three functions. First, the customer searches for information or content that is accessible over the computer network. Second, the customer shares the information with other users over the computer and communications network. Third, the customer stores the information in a place that is accessible to the customer and occasionally, others, at a later time. Simply, a connected customer wishes: "I can easily get what I want, from where I am, using what I have, and share it."

Figure 2:
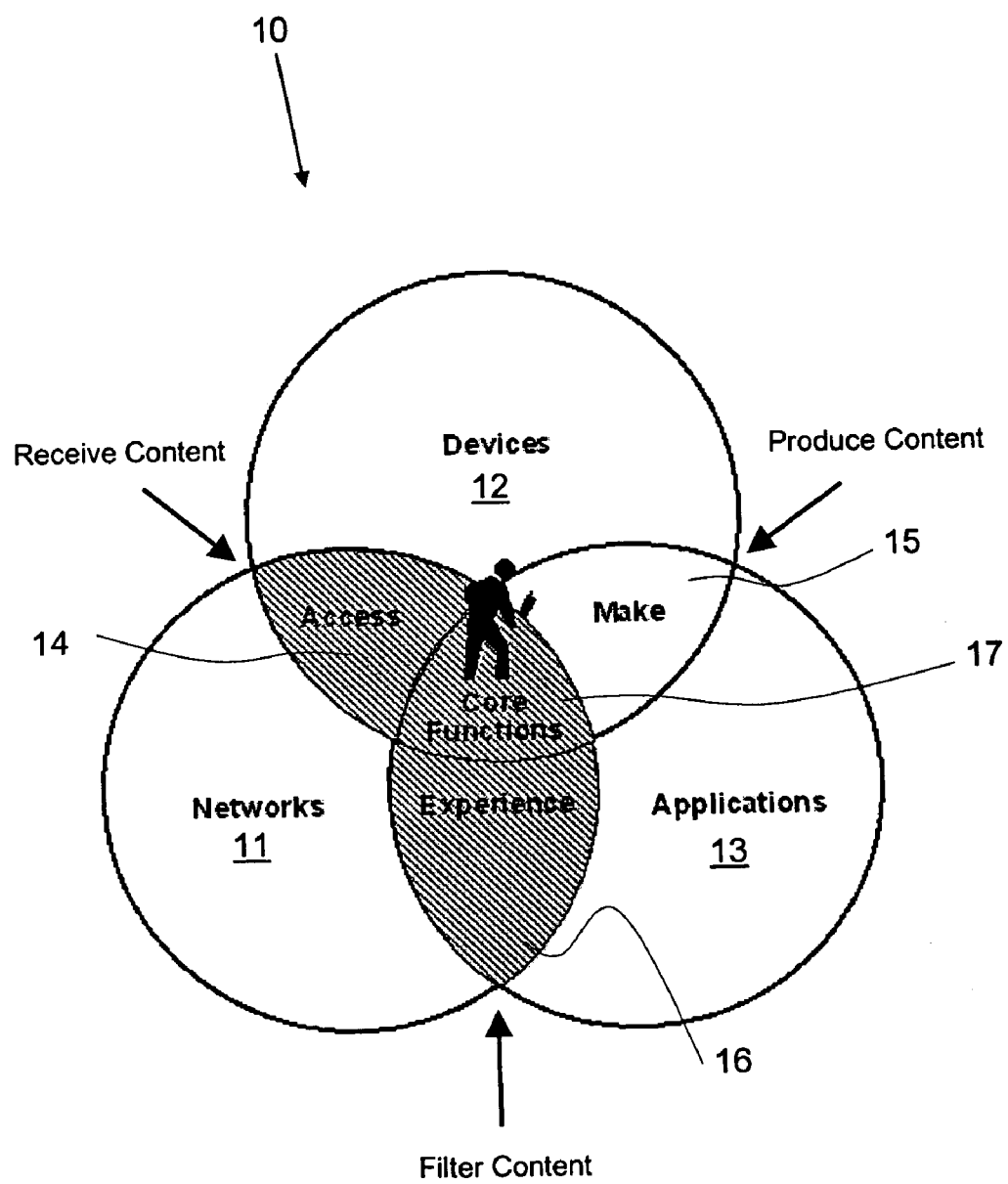
FIG. 2 is a Venn diagram showing an exemplary model of one embodiment of the invention.

FIG. 2 is a Venn diagram showing one embodiment of the invention known as the Interdependent Device, Network, and Application ("iDNA") model. The diagram can be used to perform steps 3 and 4 of FIG. 1. As explained below, the iDNA model preferably includes two or more communications networks to provide a new communications service of the invention. In preferred embodiments, three or more communications networks are involved to provide a communications service of the invention.

As shown in FIG. 2, iDNA 10 includes networks 11, devices 12, and applications 13. Networks 11 includes one or more communications networks. For example, networks 11 can include the networks shown in Table 1 above. In other words, networks 11 can include, among other networks, wireline and wireless communications networks.

Devices 12 are equipment and apparatus that are associated with networks 11. For example, if one of networks 11 is a wireless telephone network, one of devices 12 is a wireless telephone or another wireless device. Similarly, if one of networks 11 is a computer network, one of devices 12 can be a client computer. Exemplary device makers are listed in Table 1 above. Devices 11 can include any communications device that has access to a computer network using a communications network.

Applications 13 are software applications that enable services of networks 11 to be rendered to and used by devices 12. Exemplary application suppliers are listed in Table 2 above.

The area overlapped by networks 11 and devices 12 is hereinafter referred to as access area 14. The area overlapped by devices 12 and applications 13 is hereinafter referred to as make area 15. The area overlapped by networks 11 and applications 13 is hereinafter referred to as experience area 16. The area overlapped by networks 11, devices 12, and applications 13 is hereinafter referred to as core functions area 17.

Access area 14 includes all interactions between networks 11 and devices 12. For example, access area 14 can indicate the management of devices 12 by networks 11. In addition, device recognition, messages generation and management, transactions, and storage across multiple computer networks and communications service providers can be part of access area 14. Access area 14 indicates that devices 12 can receive content or information from networks 11. Access area 14 also indicates that a customer of the invention can use one of devices 12 to access one or more of networks 11 to receive content or information. For example, a wireless telephone can be used to access the Internet to obtain stock quotes and the like. Access area 14 includes key customer concerns such as speed and convenience. That is, when using devices 12 to access networks 11, customers want speed and convenience. Customers want networks 11 to provide them with communications services regardless whether they are at home, in the office, and on the go. Access area 14 also includes connection of devices 12 to networks 11. Access area 14 provides access from any network dependent device to the optimal network.

Make area 15 includes all interactions between devices 12 and applications 13. Here, applications 13 that are executable by devices 12 produce, generate, or otherwise "make" content or information. For example, a Pocket PC can be used to generate a text document or to upload a photograph from a digital camera. Make area 15 can involve using applications 13 to do anything ranging from taking a photograph, shooting a video clip, making a telephone call, or another task that a customer can do with devices 12.

Experience area 16 includes all interactions between applications 13 and network 11. This includes a customer's experience when using applications 13 over networks 11. For example, applications 13 can be used to filter content received from networks 11 based on a user's preferences. Also, experience area 16 indicates the invention's abilities to execute reusable core processes or applications. Such reusable core processes or applications eliminate waiting time and information overload. Customers want more time to do useful work rather than waiting for information to download. They also want to have better control of the information. Networks 11 enhances the customers' online experience and provide core application engines. Experience area 15 makes life better for the customers. Experience area provides core transaction engines that support a number of features of the invention including, for example, reduced waiting time, relevance filtering, and personalized building of content.

Experience area 16 also indicates that customer wants to have control over the content. Therefore, a key to generate revenue is to provide a customer with a good experience. Here, a process for introducing profitable new communications services to the mass market is conceived. A number of steps can be taken. First, the supporting infrastructure is put in place. Second, scalable integrated platforms (preferably open standards) are created. Next, a simple user interface is provided. The market demand is created and the market is introduced through business. Preferably, corporate customers can define the minimum baseline experience. The new communications service preferably provides an enhanced experience. The new communications service is preferably priced right, and is ready for plug and play. The new communications service preferably requires minimal behavior change for the customers.

Core functions area 17 includes all interactions among networks 11, devices 12, and applications 13. This includes a customer's ability to immediately search, store, and share information with anyone from any networked device. In core functions area 17, devices 12 manage information through interactions with applications 13 and networks 12. For example, customers can search, share, and store information or content. A "search" function allows a customer to receive products, services, results of research, and the like from networks 11. A "share" function allows a customer to share photographs, files, calendar, and the like with other customers. A "store" function allows a customer to deposit the content (e.g., files, photographs, music, etc.) in a place that is easily accessible at a later time. An analysis of core function area 17 revealed that customers identify with the core functions as well as the device. A preferred embodiment of the invention provides intelligent core functions, simplifies online activities, and provides consistency across devices. The core functions provide the ability to immediately search, store, and share information with anyone from any networked device. The goal is to provide a communications service that is simple, manageable, accessible, reliable, and trusted ("SMART").

Step 4: Defining Application Strategy

The fourth step involves creation of a communications service or an application. The communications service is preferably one through which one or more of the core functions are available to the customer no matter where the customer is. Preferably, the customer can use or execute these core functions the same way every time.

Many customers have multiple communications devices. Different devices are used for different functions. Moreover, the devices may be served by different network providers. For example, a customer may have a wireline telephone served by a wireline telephone network, a personal computer connected to a wireline computer network, and a wireless telephone served by a wireless telephone network.

Customers want a device (i.e., one of notebook computer, pager, wireless telephone, PDA, or the like) that can be used to make content (or produce information). Because customers identify first with the device they use, an opportunity exists for the network provider to knit customer devices together. The single device not only is preferably optimized for a primary function, the device is also preferably equipped for one or more secondary functions. The single device can preferably be used to access multiple networks (including the wireline telephone network, the computer network, and the wireless telephone network). The single device preferably operates based on an interdependency of the multiple networks.

Customers want speed and convenient when they use their devices to access the networks. Accordingly, the networks of the invention supports the customers while they are at home, in the office, and during travel. The networks and devices work together and interdependent on each other to provide speed and ubiquity to the customers.

Simplicity requires the invention to provide a platform for core functions. For mass adoption of communications devices of the invention, the core functions are as easy to perform as pushing a button.

Primary activities of network connected users are listed in Table 4 below.

TABLE 4

| Primary Activities of Network Connected Users | |
|---|---|
| Present | Future |
| Email | Share |
| Search | Store |

At the present time, network connected customers use their devices to exchange emails and search for information. In the future, in addition to email and search, these customers will also use their devices to share and store information. These customers want simplicity and consistency when executing the core functions of search, share, and store. "Search" includes searching for products, services, or researching using, for example, intelligent search (e.g., HAPAX, Autonomy). "Share" includes sending and receiving of anything, for example, photographs, files, calendar, and the like. "Store" includes the determination of how to classify information and where to store information including, for example, files, photographs, music, and the like. The networks of the invention preferably simplify online activities for these customers. Moreover, the networks preferably provide consistency across devices.

Customers want enhanced experiences. The networks of the invention expand the customers' online experience beyond just being reliable. Customers want more time efficiently spent when they are connected to the networks. They also want control of information. Accordingly, the networks of the invention enhance the customer's online experience. The networks also provide core application engines.

To reduce or eliminate waiting associated with download marginally relevant search results, the networks can offer a service through use of a filter. Once in place, the filter allows a customer to take the exact same user logic and apply it across multiple industries. Whether the customer is trying to order a pizza or to find the closest dry cleaning store, the customer pushes the same button sequencing or menu sequencing every time. This makes it easy for the user.

To decrease or eliminate information overload, personalized filtering can be identified. Different level of core desires for the customers can be defined, and the filter can select appropriate information for the customer based on the core desire level. The filter can provide different amounts of information to customers with different desire levels. In other words, the filter provides just the right amount of search results to each customer based on the customer's own defined desire.

Enhancing the networked connected experience requires a platform. To expand the use of network connected services of the inventions, applications offered must greatly enhance the customer's current experience. The concept of speed and convenience is where largest areas of opportunity are build on.

Table 5 below shows the areas of opportunities, steps that can be taken, and adoption advantages that can be realized by the communications service provider and its consumers.

TABLE 5

| Areas of Opportunities | | | |
|---|---|---|---|
| Areas of Opportunities | Steps | Network Adoption Advantage | Consumer Adoption Advantages |
| Eliminate "waiting" | | Reduce cost of service; increase customer satisfaction | Give them more time |
| Decrease "information overload" | Personalized filtering | Targeted communication | Receive needed information |
| | Personalized display of content | More effective communication (memorable) | Quicker understanding |

The network hosts the engines that house the transaction logic with the network supports broad deployment of enhanced services. The application engines supports broad based services in many sectors including healthcare, education, finance, etc. Application engines can include "no waiting," "personalized filtering," and "personalized display of content." Deployment is focused on the most lucrative area first.

FIG. 3 is an exemplary chart that indicates characteristics of companies providing various communications services. Two or more of the companies listed in the left most column can be allied to provide one or more new communications services of the invention, which are described below.

New Communications Services of the Invention

Figure 4:
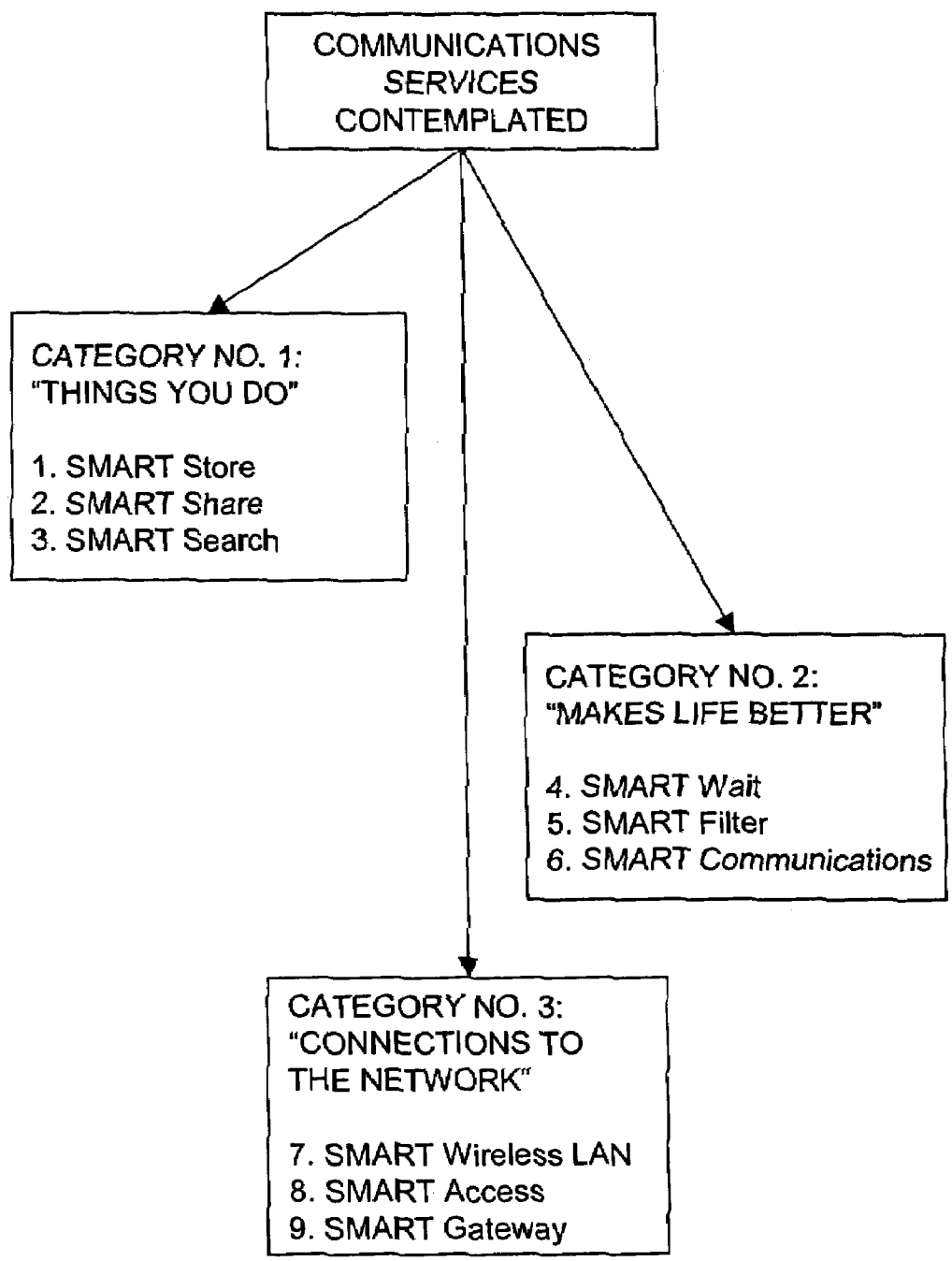
FIG. 4 is a diagram that shows categories of exemplary communications services of the invention.

Many new communications services have been contemplated based on the exemplary iDNA model described above. For illustration purposes and the sake of brevity, only nine communications services are disclosed herein. These communications services are grouped in three categories as shown in FIG. 4.

The first category is hereinafter referred to as the "Things You Do" services, which include the SMART Store Service, the SMART Share Service, and the SMART Search Service. The second category is hereinafter referred to as the "Makes Life Better" services, which include the SMART Wait Service, the SMART Filter Service, and the SMART Communications Service. The third category is hereinafter referred to as the "Connections to the Network" services, which include the SMART Wireless LAN Service, the SMART Access Service, and the SMART Gateway Service. Additional communications services contemplated include those that combine two or more communications services listed above.

Communications Service No. 1: SMART Store Service

One embodiment of the SMART Store Service is a communications service that, among other things, intelligently saves and archives content for its user. Based on default settings or user-defined preferences, the SMART Store Service saves content for its user without requiring an action from the user.

Preferred embodiments of the SMART Store Service has one or more of the following features. First, the SMART Store Service provides automatic archiving and retention. Second, the SMART Store Service makes available a storage space for each of its users. The storage space preferably exceed an anticipated requirement of the user. Third, the SMART Store Service has a default setting that saves the content on behalf of the user without requiring input or instructions from the user regarding saving the content. Fourth, the SMART Store Service allows its users to provide user-defined preferences. The preferences provides instructions regarding how archiving should be done. Fifth, the SMART Store Service retrieves content by using attributes, purpose, and/or subject. Sixth, the SMART Store Service provides a physically secure environment. Seventh, the SMART Store Service allows access to content by other users at the customer's discretion.

The target market for the SMART Store Service includes individual consumers and the professional service industry. Potential customers includes individuals who desire automatic organization of contents, secure archives, collection of reference information online, and mobility. The professional service industry includes doctors, lawyers, real estate agents, and the like.

The value proposition for a consumer is that the SMART Store Service provides an ubiquitous access to the archived content. Once the content is archived in the storage space assigned to a user, the user can access the content anytime, anywhere, and from any device. For an existing communications service provider that wishes to offer its customers the SMART Store Service, the SMART Store Service creates an initial demand by users for storage. Once the contents are archived, the users are expected to remain loyal and are likely to subscribe other SMART services of the invention.

Figure 5:
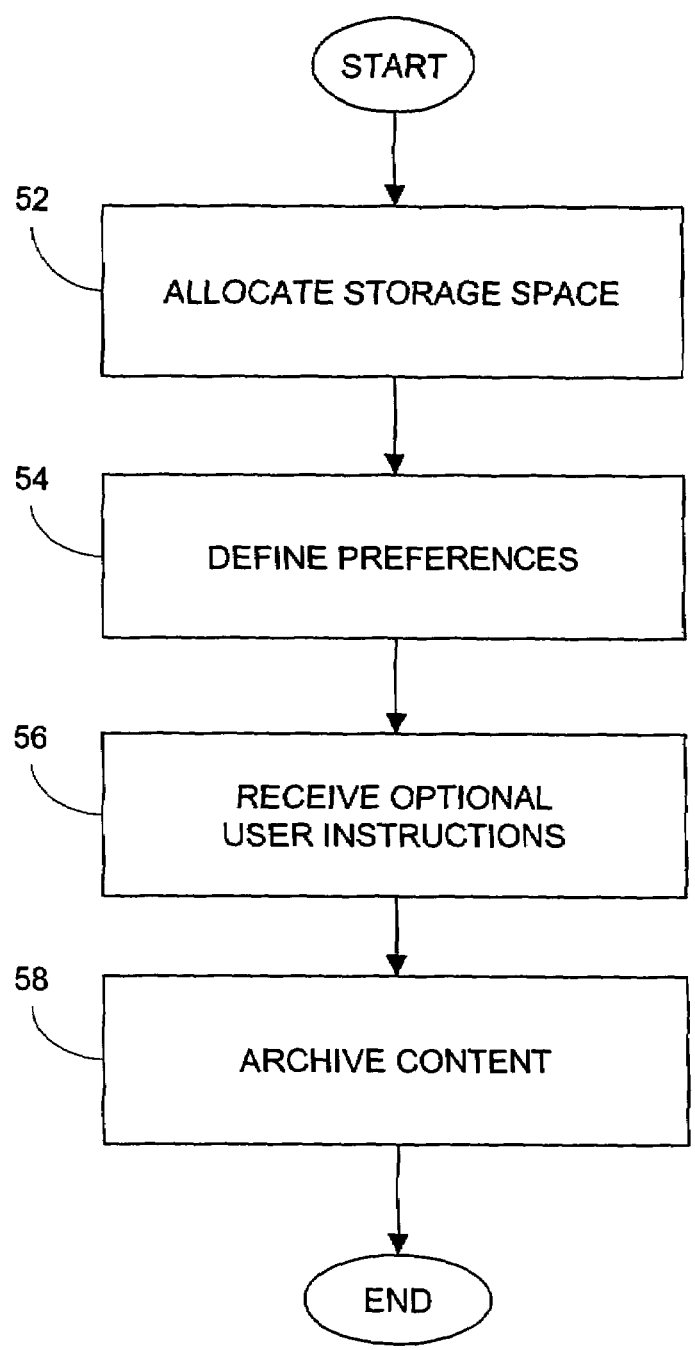
FIG. 5 is a flowchart showing exemplary steps that can be taken to implement an embodiment of the SMART Store Service.

FIG. 5 is a flowchart showing exemplary steps that can be taken to implement an embodiment of the SMART Store Service for a user or customer. In step 52, a storage space is allocated or assigned to the user. The storage space preferably has a size that exceeds the requirement of the user. For example, if the user is expected to need one gigabyte of space, two gigabyte are allocated for that user. In step 54, preferences are defined. The preferences may include default settings defined by the communications service provider. Preferably, the preferences are supplied by the user. In step 56, optional instructions to save contents are received from the user. In step 58, the SMART Store Service archives the content based on the instructions received in step 56 or in accordance with the preferences defined in step 54.

Preferably, in step 56, the instructions may be written or spoken. For example, a communications device that is equipped with a microphone may be adapted to recognize spoken words of the user. Preferably, in step 58, the SMART Store Service reviews or analyzes the content or document, and archives it based on the content's characteristics. For example, keywords may be generated and associated with the content being saved. One or more of the keywords can be used later by the user to retrieve the content.

Figure 5A:
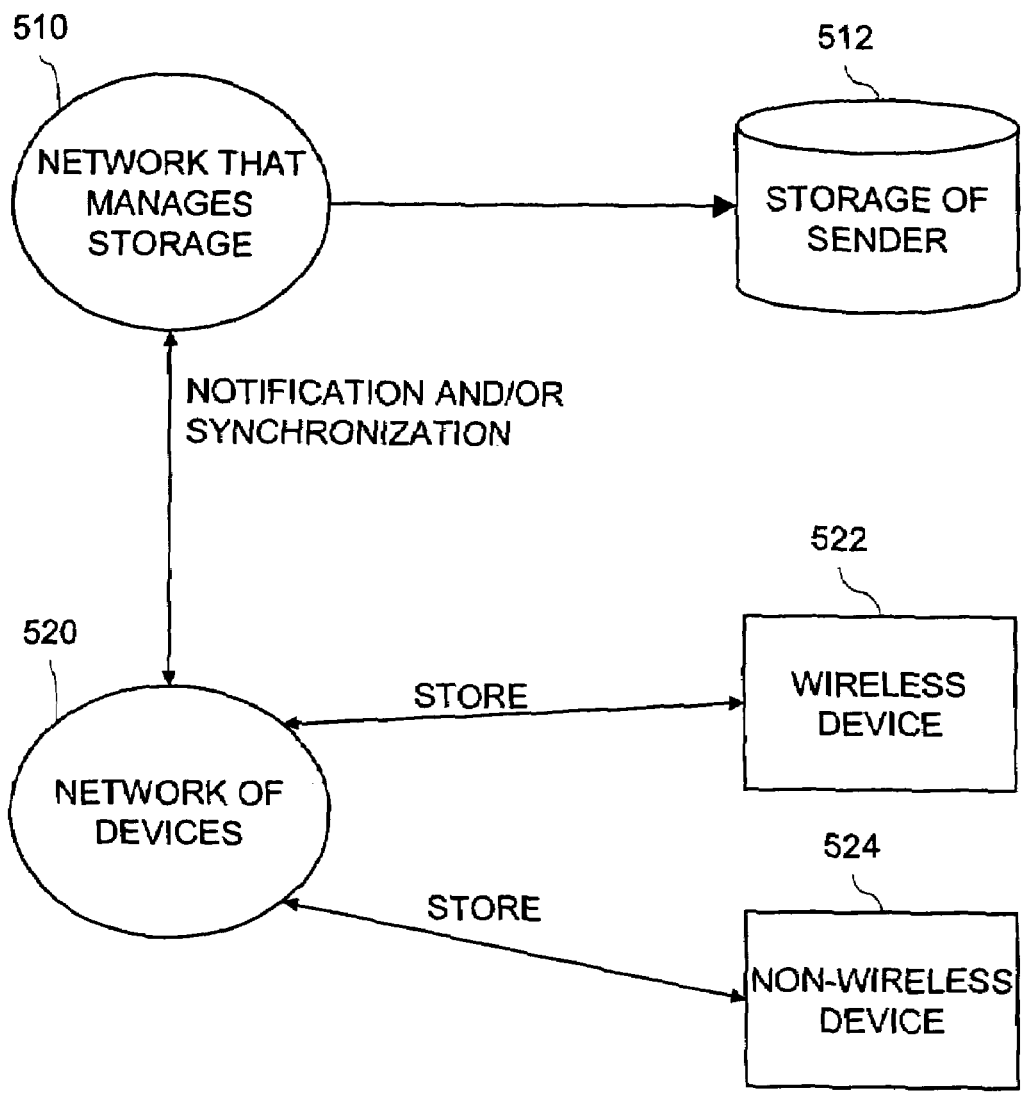
FIG. 5A is a schematic diagram showing an exemplary system of the SMART Store Service of the invention.

FIG. 5A is a schematic diagram showing an exemplary system architecture of the SMART Store Service of the invention. A customer (storer) uses one of wireless device 522 and non-wireless device 524 to store data. A message is routed from a network of the devices (network 520) to a network that manages storage (network 510). The data is stored in storage 512. A message is sent to the appropriate devices for the customer that the data is now available in storage 512. All appropriate networked devices for the customer are synchronized with stored data. The customer can later access storage 512 using one of devices 522, 524, or other device such as, for example, a computer having access to network 510.

Communications Service No. 2: SMART Share Service

One embodiment of the SMART Share Service provides an ability to immediately access and share any of the customer's stored information with anyone. Preferred embodiments of the SMART Share Service include one or more of the following features. First, the SMART Share Service sends a copy of digital information by a user of the invention to another person. Digital information takes advantage of the latest technology in information exchange and transfers. Second, the SMART Share Service provides access to copies placed in a shared network storage space. For example, if the sender and the receivers are all users or subscribers of the invention, a shared network storage space may be used for all of them. All users (sender and receivers) have access to the shared network storage space. Third, the SMART Share Service determines appropriate delivery mechanism and receiver address. Preferably, the sender's communications device has in it a profile for each of the receivers. The SMART Share Service retrieves the profile and sends the content to the receivers according to the profiles. Fourth, the SMART Share Service provides delivery status. The delivery status can be provided to both the sender and the receivers. This is helpful especially if the receiver can be notified of, at a wireless device, a successful transfer of the content to a computer network that the receiver can later log on to review the content.

There are a number of target markets for the SMART Share Service. For example, target markets include consumers who want to influence or entertain others, education and training industries, and consumers and enterprises who collaborate within or across industries.

The value proposition of the SMART Share Service is that it makes it simple to share content regardless of device or network. For a communications service provider, the SMART Share Service exponentially explodes demand for storage.

An embodiment of the SMART Share Service may involve the following scenario. A user has information or content that she wants to share with somebody else. For discussion purposes, assume that the content is a digital photograph of Mount Fuji. However, the content can be anything including a text file or another document of a different format. The user meets a friend named Sally. The user tells Sally about her trip to Japan. Sally wants to see the photograph of Mount Fuji. The user takes out her communications device and clicks a "Share" button. A prompt asks for an identification of the content to be share and a recipient of the content. The user speaks to her communications device, "Send that Mount Fuji picture to Sally." Moments later, The user receives a confirmation on her communications device that the transfer has been executed successfully. At the same time, the photograph is now accessible to Sally. Preferably, Sally has a wireless device with her that she can use to view the photograph. If the wireless device is not equipped to view the photograph, Sally receives a notification of a deposit of the photograph in her storage space associated with a network, which Sally can later access to view the photograph. In this scenario, both recipient and sender are preferably subscribers of the SMART Share Service of the invention.

Figure 6:
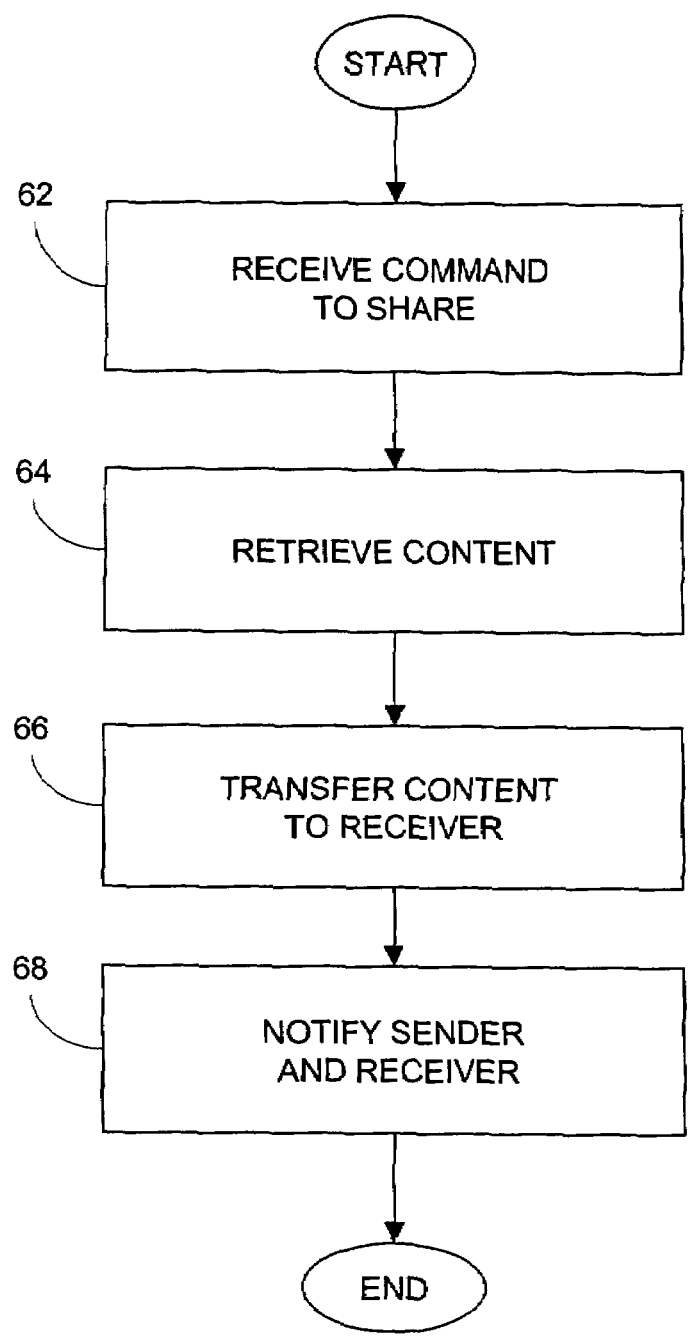
FIG. 6 is a flowchart showing exemplary steps that can be taken to implement an embodiment of the SMART Share Service.

FIG. 6 is a flowchart showing exemplary steps that can be taken to implement an embodiment of the SMART Share Service. In step 62, the SMART Share Service receives from a sender-user a command to share a document. The document can be one that which is being reviewed by the sender-user. The document can also be one that is identifiable by the sender-user using filenames, keywords, description, or another identification. In step 64, if the document is not already being reviewed, the SMART Share Service retrieves the document. In step 66, the SMART Share Service transfers the document retrieved in step 64 to a receiver-user identified in step 62. In step 68, one or more of the sender-user and the receiver-user are notified of the transfer.

Preferably, the document is transferred in step 66 directly to a wireless device of the receiver-user if the wireless device is capable of displaying the document. Otherwise, the document is transferred to a storage space associated with the receiver-user. Upon receipt of the notification in step 68, the receiver-user can access the document using a communications device other than the wireless device to review the document.

Figure 6A:
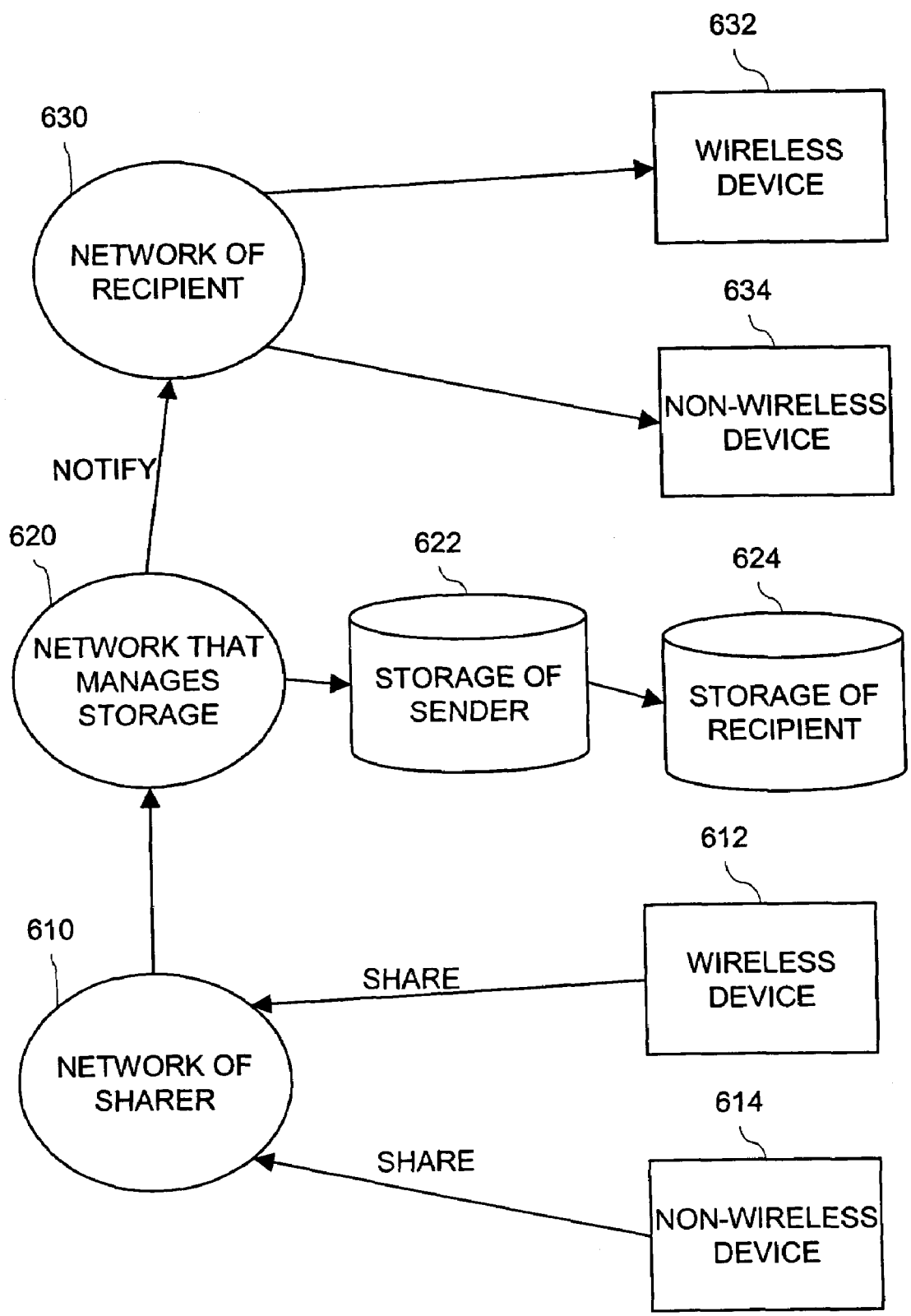
FIG. 6A is a schematic diagram showing an exemplary system of the SMART Share Service of the invention.

FIG. 6A is a schematic diagram showing an exemplary system architecture of the SMART Share Service of the invention. The customer (sharer) uses one of wireless device 612 and non-wireless device 614 to share network stored data with one or more recipients who uses one or more of wireless device 632 and non-wireless device 634. A message is routed from the sharer's network (network 610) for the sharer's device to the network that manages the stored data (network 620). A copy of the data is stored in the network storage for the recipient or recipients (network 630). A message is sent to the appropriate devices for the recipients that the share data has been transferred from storage 622 to storage 624 of the recipient. Transfer in this context means a copy is created by network 620 and deposited in storage 624. In other embodiments, network 620 grants the recipients access to storage 622. In still other embodiments, the sender and recipients share a common storage.

Communications Service No. 3: SMART Search Service

One embodiment of the SMART Search Service provides a research engine tailored to the user's experience and/or knowledge level. A preferred embodiment of the SMART Search Service includes one or more of the following features. First, the SMART Search Service allows users to ask questions in plain language. Second, the SMART Search Service answers the questions in a text paragraph, a table, and/or a summary. Third, the SMART Search Service cites the sources of the answers if further research is desired. Fourth, the SMART Search Service allows control of search sources.

The target market of the SMART Search Service includes, for example, consumers with educational needs, the education industry, and companies with intranets. The value proposition is that the SMART Search Service provides the right level and amount of information for its users. For a communications service provider, the value proposition provided by the SMART Search Service is that it expands market demand for access to the communications service provider's networks. The SMART Search Service can be implemented using a wireless device or wireline device.

Figure 7:
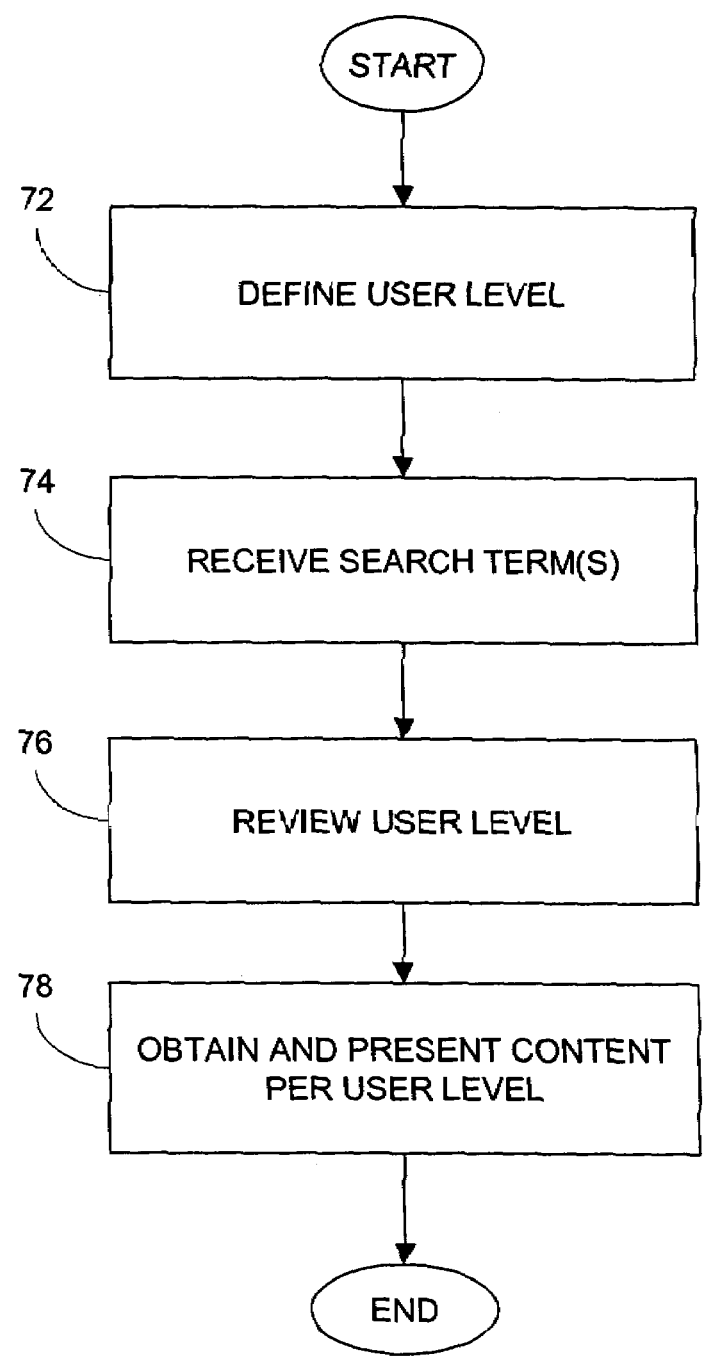
FIG. 7 is a flowchart showing exemplary steps that can be taken to implement an embodiment of the SMART Search Service.

FIG. 7 is a flowchart showing exemplary steps that can be taken to implement an embodiment of the SMART Search Service. An exemplary example is included in describing the SMART Search Service although the invention is not limited to the embodiment disclosed.

In step 72, a user of the SMART Search Service defines his user level. For example, a professional Italian cook may define himself as a Level 5 (on the scale of 1 to 5) user, and a culinary student may define herself as a Level 2 user on the same scale. Still other users may associate themselves with different levels of the scale.

In step 74, the user provides one or more search terms. In this case, the search terms may include the phrase, "How to make pizza."

In step 76, the SMART Search Service reviews the user level. If the user who provided the search terms in step 74 is the professional cook, the SMART Search Service obtains a user level of Level 5. On the other hand, a user level of Level 2 is retrieved if it were the culinary student who supplied the search terms in step 76.

In step 78, the SMART Search Service obtains and presents search results according to the user level. For example, for the professional cook, the content presented would include more advance recipes regarding how gourmet pizzas are made. For the culinary student, the content present would preferably include entry-level recipes that is appropriate for Level 2 users.

It is noted that the user levels discussed above can be defined differently. For example, the professional cook may define his user level as "authentic Italian" and the culinary student may define her user level as "highly curious." In this case, the content presented to the professional cook would only include recipes from Italian sources, and the content presented to the culinary student would include a history of pizza, statistics regarding consumption of pizzas in different regions of the world, and so on.

Figure 7A:
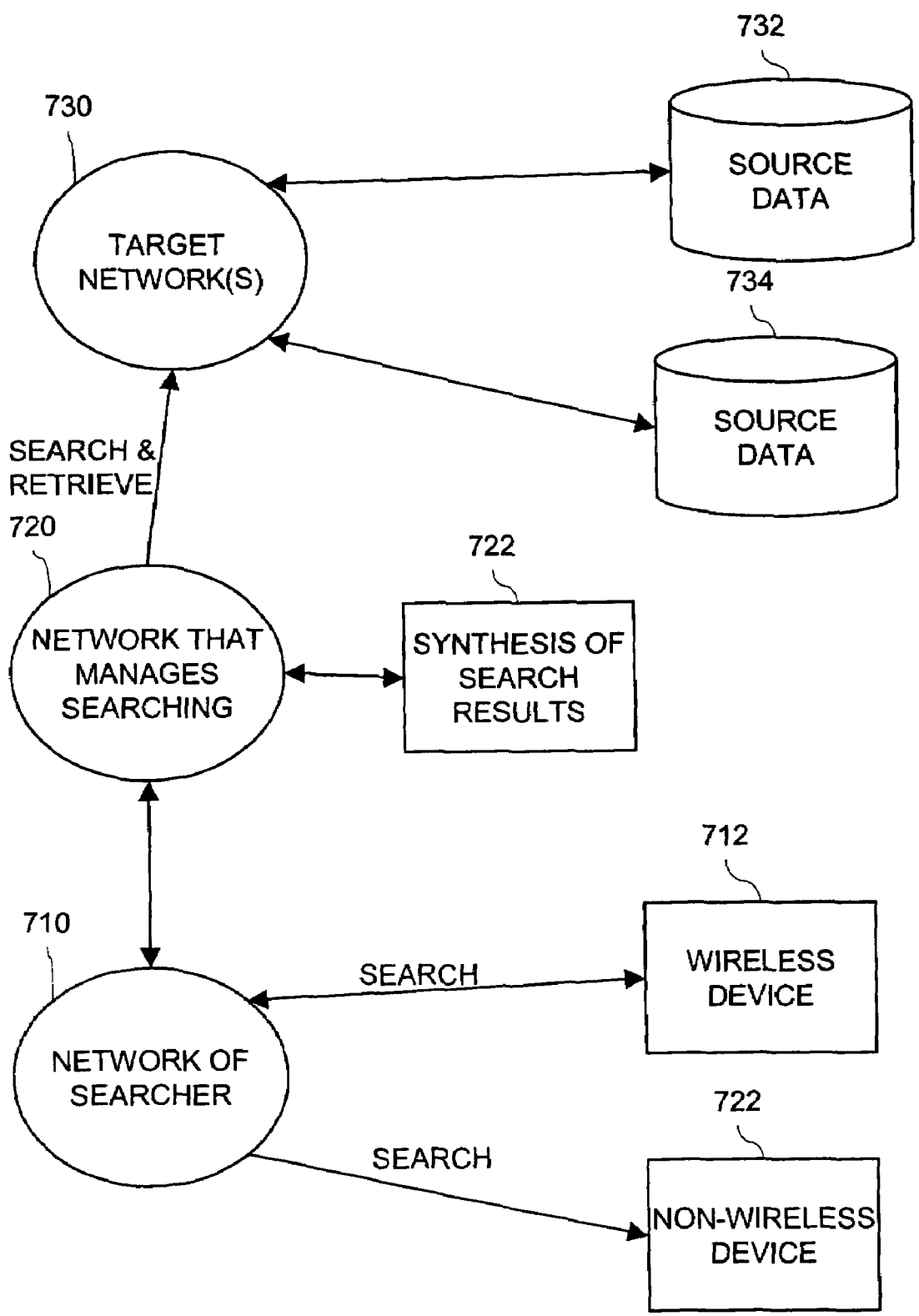
FIG. 7A is a schematic diagram showing an exemplary system of the SMART Search Service of the invention.

FIG. 7A is a schematic diagram showing an exemplary system architecture of the SMART Search Service of the invention. The searcher uses a device (one or wireless device 712 and non-wireless device 722) to start a search of targeted sources (one or more of source data 732 and 734). The targeted sources are searched and results are returned for processing. The results are synthesized. The synthesis and the source referenced are sent to the searcher via network 720.

Communications Service No. 4: SMART Wait Service

Figure 8:
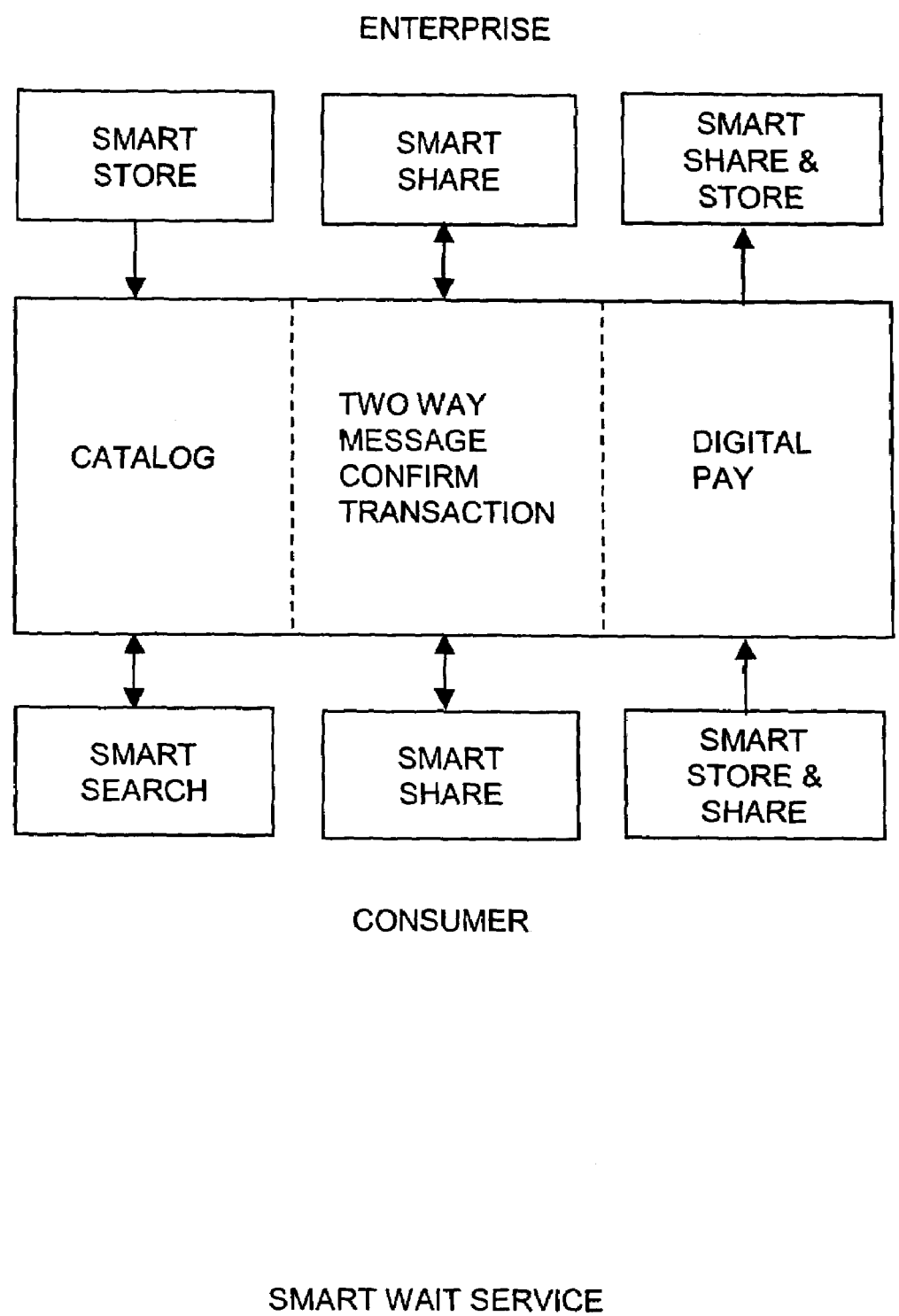
FIG. 8 is schematic diagram showing an exemplary SMART Wait Service of the invention.

One embodiment of the SMART Wait Service provides a reusable, universal application that enhances the essence of the core functions of the SMART search, SMART Store, and SMART Share services. FIG. 8 is schematic diagram showing an exemplary SMART Wait Service of the invention.

There are several value propositions to a consumer user. First, the SMART Wait Service eliminates the wait associated with a user's attempts to be connected to the network. Second, the SMART Wait Service tells a vendor what the consumer want. Third, the SMART Wait Service gets from the vendor what the consumer want. Fourth, the SMART Wait Service pays for what the consumer want while online. To a business enterprise user, the value proposition is that the SMART Wait Service increases customer satisfaction; decreases cost of customer service, and increases revenue and revenue per floor space. To a communications service provider, the value proposition is that the SMART Wait Service drives market demand for the SMART Access Service, which is described below. Another value proposition to the communications service provider is that one application with a common user interface drives mass adoption.

Service enabling applications can be associated with the SMART Wait Service. A first application includes a catalog that provides offerings of a service business. A second application includes two-way messaging that confirms order received and availability. A third application includes digital payment.

There are several exemplary enterprise users of the SMART Wait Service. For example, a restaurant franchisee can use the SMART Wait Service to list meal options, receive orders from customers, and allow customers to select a time to pick up the orders. Another enterprise user may be a video rental store that can use the SMART Wait Service to allow its customers to select movie, confirm availability, and select pick up time online.

As shown in FIG. 8, the SMART Wait Service can involve one or more of the SMART Store Service, the SMART Share Service, and the SMART Search Service. For example, The enterprise user can use the SMART Store Service to make available its catalog of produces and services that a consumer user can access using the SMART Search Service. In addition, through the SMART Share Service, both the enterprise and the consumer users can engage in two-way communications sessions, which can include exchanges of message regarding confirmation of transactions. Finally, through the SMART Share Service and the SMART Store Service, the consumer user can make digital payment, i.e., via use of a credit card online, to the enterprise user.

The SMART Wait Service allows a user to eliminate wasted time associated with staying in line. For example, through the SMART Wait Service, the user who wants to rent a movie can review an online catalog of a movie rental store, select a movie, and pay for it ahead of time. When the user goes to the movie rental store, he can simply bypass the line and just pick up the selected movie. Similarly, a SMART Wait Service implemented by a restaurant franchisee can display its menu and allow a customer to order and designate a pick up time. The restaurant franchisee can then prepare the food ready for pick up.

Communications Service No. 5: SMART Filter Service

Figure 9:
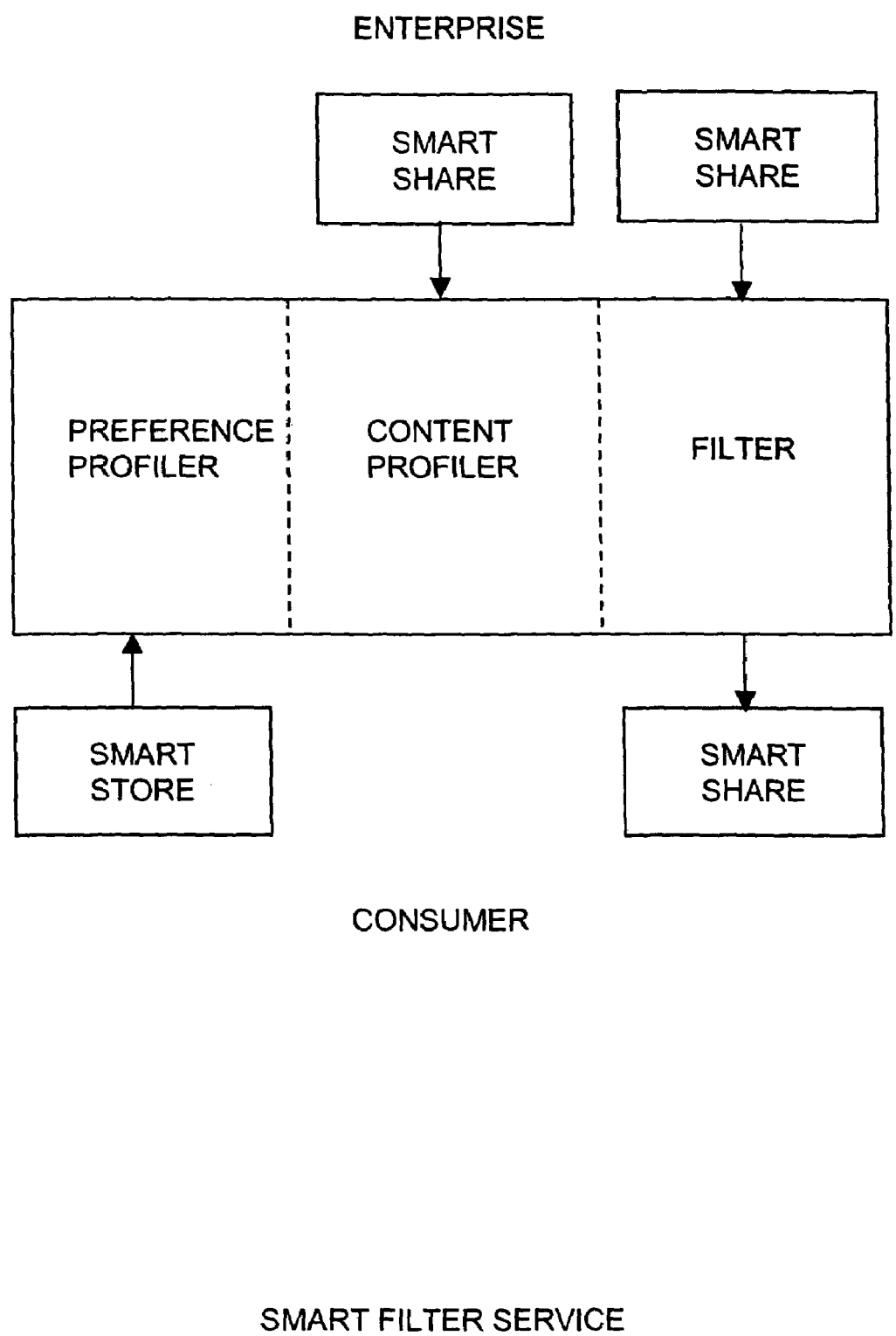
FIG. 9 is schematic diagram showing an exemplary SMART Filter Service of the invention.

One embodiment of the SMART Filter Service provides a reusable, universal application that enhances the essence of the core functions of the SMART search, SMART Store, and SMART Share services. FIG. 9 is schematic diagram showing an exemplary SMART Filter Service of the invention.

There are several value propositions to a consumer user of the SMART Filter Service. For example, the SMART Filter Service protects personal time and space. In addition, the SMART Filter Service provides time efficiency through information management. Moreover, the SMART Filter Service increases exposure to personally relevant information. To a business enterprise user, the value proposition is that the SMART Filter Service provides more effective targeting of messaging and communications to existing/potential customers. To a communications service provider, the value proposition is that consumers pay for the service and begin to share information about themselves, thus giving the communications service provider more information to market additional services to the consumers.

The SMART Filter Service can include a number of service enabling applications. First, the SMART Filter Service can include a preference profiler, which provides questions and answers that identifies personal content preferences. Second, the SMART Filter Service can include a content profiler, which categorizes the content across the preferences used in the individual profile. Third, the SMART Filter Service can include a filter, which is a predetermined, personalized accept/reject criteria for device and storage.

The sample market users for the SMART Filter Service include consumer who have information overload and companies who send alerts (sales, competitive information, etc.).

Preferably, a profile of the SMART Filter Service identifies the personal and individual preferences. The questions and answers can be used to categorize the content across preferences. This allows a user to see only those things that the user is interest in. This can be highly user specific. For example, a college professor may have identified sixteen desires, but a high school student may only have five desires associated with a common topic. By mapping out the desires for different users, each user can receive only content that is highly relevant to him or her, and no more.

As shown in FIG. 9, an enterprise user can provide the content profiler and the filter through the SMART Share Service, and a consumer user can provides the preference profiler through the SMART Store Service. Information from the enterprise user can be provided to or retrieved by the consumer user through the SMART Share Service.

Communications Service No. 6: SMART Communications Service

Figure 10:
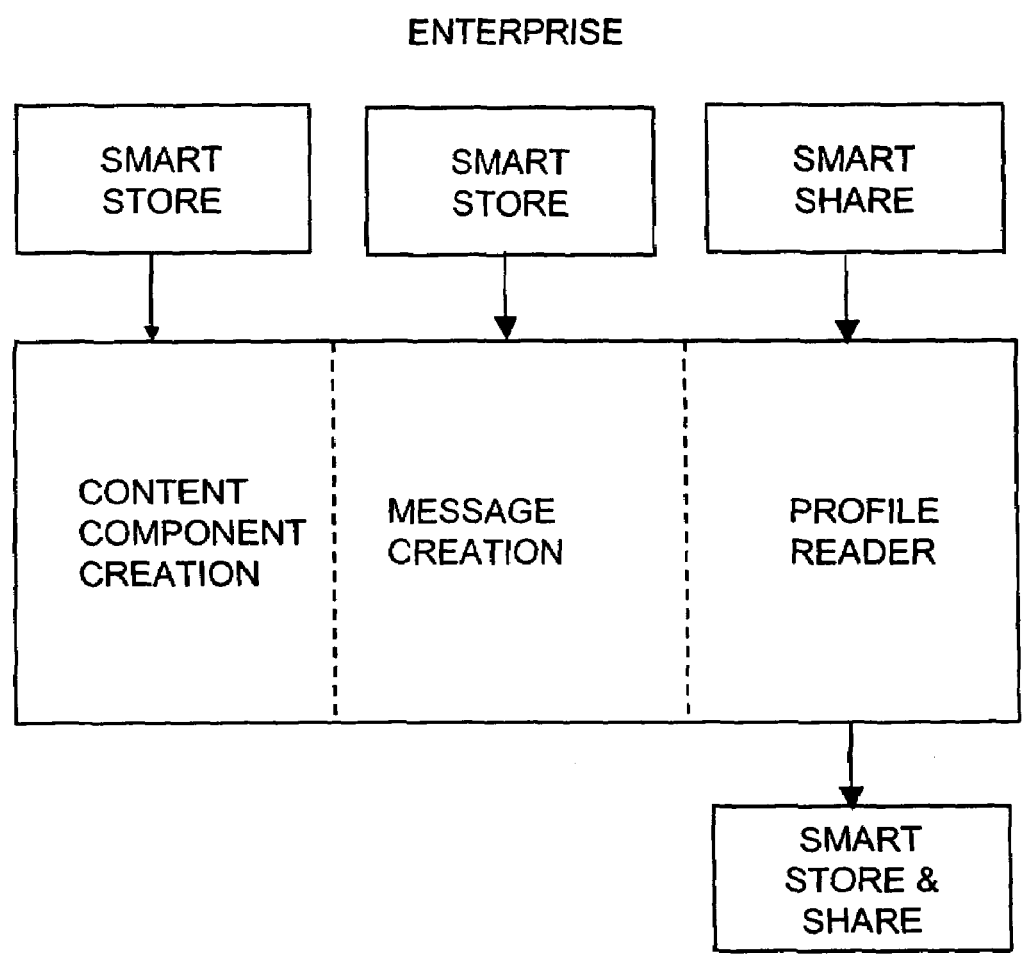
FIG. 10 is schematic diagram showing an exemplary SMART Communications Service of the invention.

One embodiment of the SMART Communications Service provides a reusable, universal application that enhances the essence of the core functions of the SMART Store and SMART Share services. FIG. 10 is schematic diagram showing an exemplary SMART Communications Service of the invention.

One value proposition to an enterprise user of the SMART Communications Service is that, instead of spending multiple days crafting one message tailored for many potential audiences, with a limited success rate, write the content once and it can be configured and personalized for the individual reader for maximum understanding and retention. To a communications service provider, the value proposition is that the SMART Communications Service creates a dependency between company's operations and the communications service provider.

There are a number of service enabling applications that can be associated with the SMART Communications Service. For example, the enterprise user, through an application of the SMART Store Service, can include a content component creation tool, which enters the message based on human attention and retention factors. Through an application of the SMART Store Service, the enterprise user can include a message creation tool, which assembles the header, content, visuals, influencer and action steps based on the receiver's profile. Through an application of the SMART Share Service, the enterprise user can include a profile reader, which reads an individual's profile from his or her digital ID. Through one or more applications of the SMART Store Service and the SMART Share Service, the consumer user can receive the content from the enterprise user.

An exemplary use of the SMART Communications Service involves a company that has a message to send to a broad audience, which has diverse interests in different parts of the message. For example, in one embodiment of the SMART Communications Service, a large automobile manufacturer may be a subscriber. In this embodiment, each employee of the company is categorized or defined based on, for example, the department with which the employee is associated. A 100-page memorandum authored by the chief executive officer may be distributed using the SMART Communications Service. For example, an accountant of the company may receive just three pages of the memorandum, which are relevant to accounting. The assembly line workers may receive 10 pages of the memorandum concerning safety issues. Using the SMART Communications Service, the chief executive officer does not have to be concerned with physically sending different versions of the memorandum to his employees. All he needs to do is send the memorandum to all employees, and the SMART Communications Service distributes relevant pages to appropriate employees.

Preferably, the SMART Communications Service can break off the components of a message. In addition, the SMART Communications Service can preferably document the breaking off so that the message can be re-assembled for a receiver, as appropriate. A message creation tool preferably can break a message down into verbal pairs, verbal categories, chain, and rules. This allows different users to retrieve different parts of a message based on their preferences. For example, a first user who is more visually oriented may prefer to receive graphics rather than text. Another user who is more verbally gifted may prefer text-based messages. The SMART Communications Service is preferably adapted to compile messages according to these preferences. Therefore, when one message is being broadcast, different users would receive the same message but presented in a format that is preferred by the user. In addition to preferences for graphics or text, different users may select preferred colors for presentation. For example, if a first user prefers blue, the message would be presented on the first user's communications device in blue. Basically, the message can be flexibly tailored such that it has the maximum impact on each individual receiver.

Figure 10A:
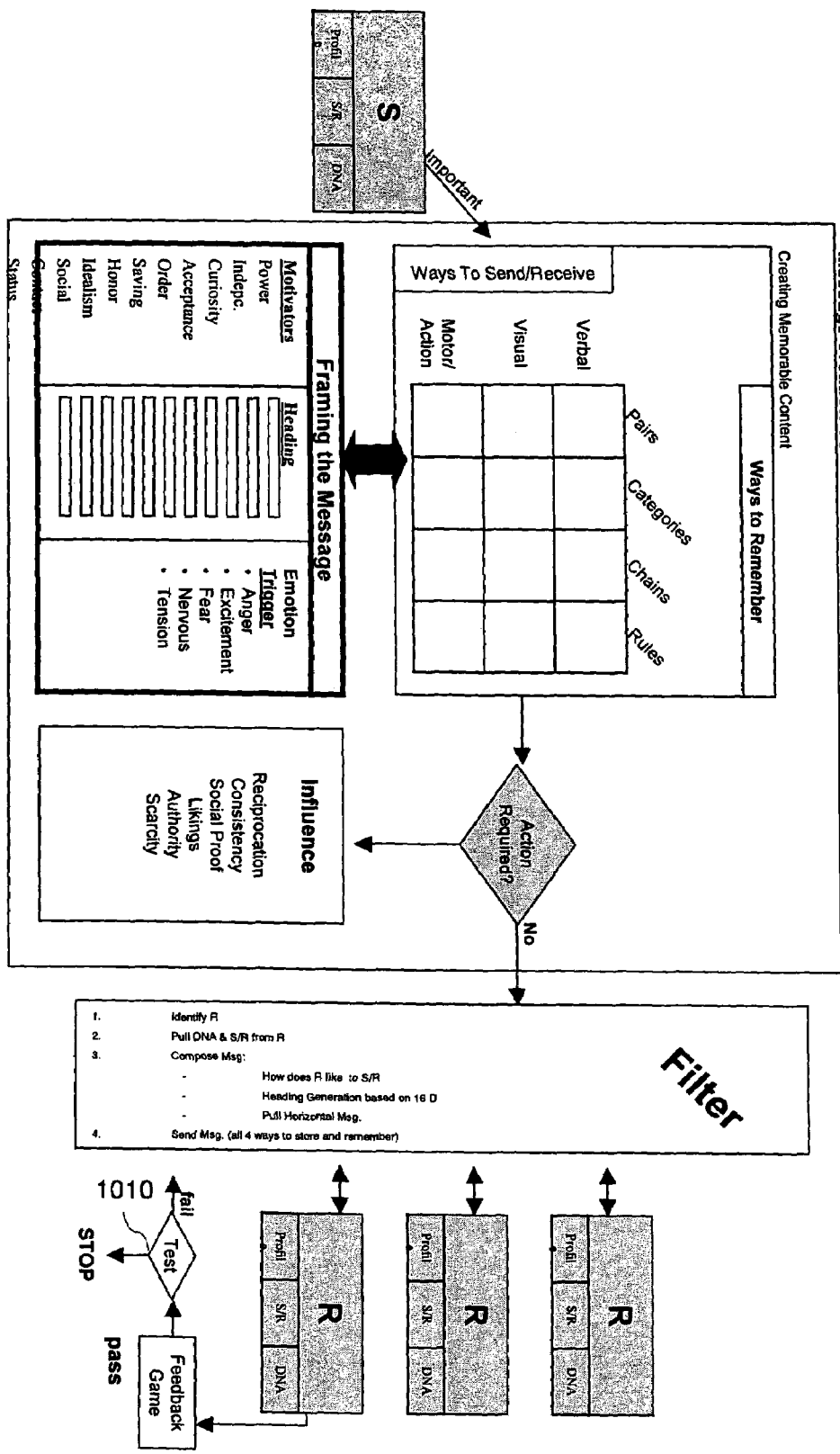
FIG. 10A is an schematic diagram showing an exemplary system of the SMART Communications Service.

FIG. 10A is an schematic diagram showing an exemplary system of the SMART Communications Service. The SMART Communications Service, via testing mechanism 1010 shown in FIG. 10A, allows the sender to receive feedback on the level of understanding the sender's audience gained through the sent message. By playing a feedback game the receiver will demonstrate her achieved learning level and with that provide a feedback mechanism to the sender. If needed the sender is now able to resend the message to achieve desired level of understanding.

Communications Service No. 7: SMART Wireless LAN Service

One embodiment of the SMART Wireless LAN Service is a fixed wireless service that allows mobile network connection within a premises or a building. Preferred embodiments of the SMART Wireless LAN Service can include one or more of the following features. First, the SMART Wireless LAN Service includes a cost effective alternative to hard wiring. Second, the SMART Wireless LAN Service is easier to respond to changes within the organization or customer base.

The target market of the SMART Wireless LAN Service includes corporations of all sizes, the service industry, and home networking. The value proposition is that the SMART Wireless LAN Service provides differentiation by enabling the enterprise to provide mobile network connectivity for their customers (internal or external). Another value proposition is that it provides connected roaming within the home. For a communications service provider, the SMART Wireless LAN Service exposes customers to its broadband and home network advantages.

Preferred embodiments of the invention involves two or more communications technologies. Preferably, at least three communications technologies should be included in a preferred embodiment. A preferred embodiment preferably includes a broadband communications network, (which can be wireline, cable, or wireless), a LAN, and a wireless device. By putting these the entities together, the preferred embodiment provides the ability for customers to perform broadband type applications when they are in a location that has a wireless LAN. The combination of broadband and wireless LAN give the customers ubiquity within a building or premises environment. Mobile wireless can be used when outside a premises environment for quick queries or staging instructions for execution through premises networks.

Communications Service No. 8: SMART Access Service

For a communications service provider, providing one embodiment of the SMART Access Service allows revenue opportunities for hosting network connectivity and on-going operations. The SMART Access Service provides access from any network connected device to the optimal network (cable, wireline, mobile wireless, fixed wireless). Features of the SMART Access Service include management of device discovery, messages, transactions and storage across multiple networks and providers, and the display of multiple devices.

The target market of the SMART Access Service includes service industries with a focus on customer service (e.g., travel, finance, billing, transportation, entertainment, content providers). The value proposition of the SMART Access Service is that it enables the enterprise to be more accessible to their customers.

Figure 11:
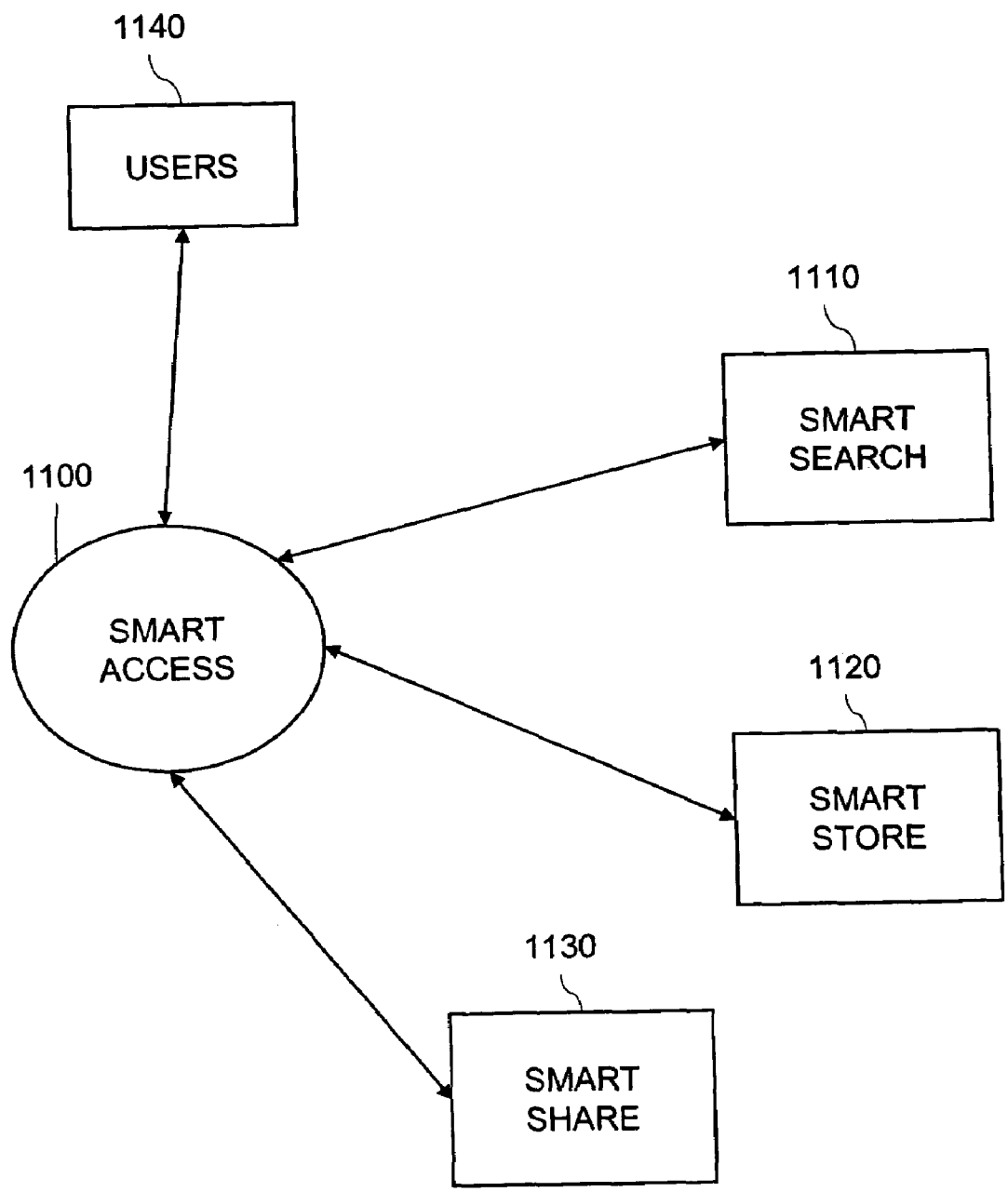
FIG. 11 is a schematic diagram showing an exemplary system of the SMART Access Service of the invention.

FIG. 11 is a schematic diagram showing an exemplary system architecture of the SMART Access Service of the invention. SMART Access Service 1100 discovers networked connected devices that are attempting to send a message to activate one or more of the SMART Search Service 1110, the SMART Store Service 1120, and the SMART Share Service 1130. SMART Access Service 1100 identifies a communications device and remembers its identity and attributes. SMART Access Service 1100 receives and processes the request for one of the SMART services. SMART Access Service 1100 notifies the appropriate devices with the requested information.

Communications Service No. 9: SMART Gateway Service

Figure 12:
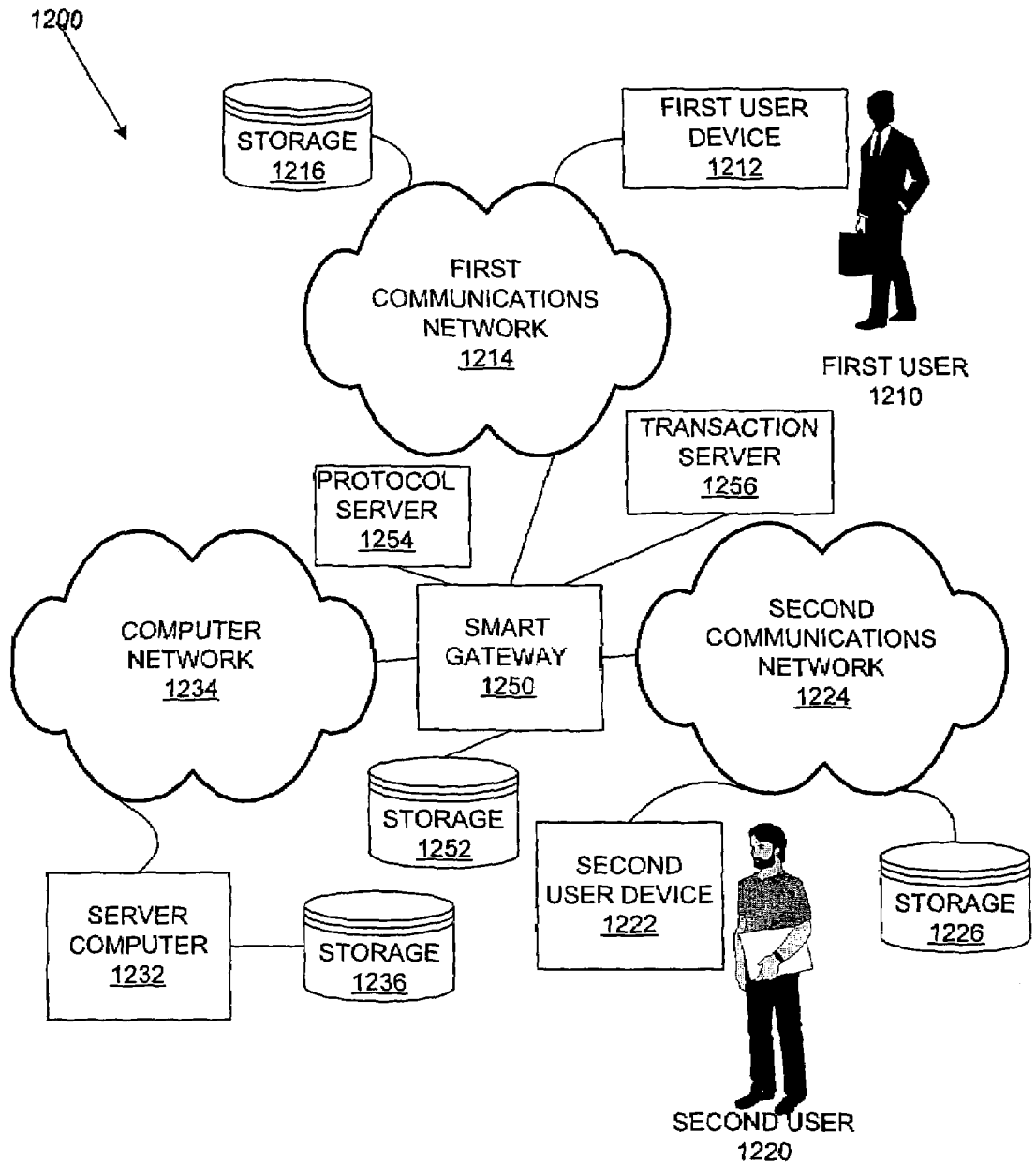
FIG. 12 is a schematic diagram showing an exemplary system of the SMART Gateway Service of the invention.

FIG. 12 is a schematic diagram showing a system architecture of an embodiment of the SMART Gateway Service of the invention. System 1200 includes first communications network 1214, second communications network 1224, computer network 1234, and SMART Gateway Interface 1250. Although SMART Gateway Interface 1250 is shown in FIG. 12 to be in communication with only one computer network and two communications networks, SMART Gateway Interface 1250 can be adapted to be in communication with additional computer networks and communications networks.

Computer network 1234 may be, for example, the Internet, an Intranet, a LAN, a wide area network (WAN), or the like. Each of first communications network 1214 and second communications network 1224 may be, for example, a telephone network such as a PSTN, a wireless intelligent network, an Advanced Intelligent network, or the like.

Computer network 1234 includes a number of server computers. Server computer 1232 is one of several server computers connected to computer network 1234. Server computer 1232 has access to information in storage 1236. Server computer 1232 and storage 1236 can be, for example, any typical servers and databases currently available. Preferably, server computer 1232 and storage 1236 are accessible over the Internet.

First communications network 1214 includes a number of user devices. First user device 1212 is one of several user devices connected to first communications network 1214. Through first user device 1212, first user 1210 can, among other tasks, store, access, and retrieve information in storage 1216.

Second communications network 1224 includes a number of user devices. Second user device 1222 is one of several user devices connected to second communications network 1224. Through second user device 1222, second user 1220 can, among other tasks, store, access, and retrieve information in storage 1226.

Each of first user device 1212 and second user device 1222 can be, for example, a desktop computer, a laptop computer, a wireless telephone, a pocket PC, a personal digital assistant (PDA), an interactive pager, or the like. Each of first user device 1212 and second user device 1222 is adapted for communicating with SMART Gateway Interface 1250 via first communications network 1214 and second communications network 1224, respectively. For example, a modem is equipped with the user devices to facilitate communications sessions via the communications networks.

In this embodiment, although first user device 1212 and second user device 1222 are associated with two different communications networks, first user 1210 and second user 1220 can share information via SMART Gateway Interface 1250. For example, through first communications network 1214, first user 1210 uses first user device 1212 to obtain information from storage 1236 of server computer 1232. First user 1210 can then store the information in storage 1216. First user 1210 can then make the necessary provision to provide access to second user 1220 to retrieve the information from storage 1216. Second user 1220 can retrieve the information using second user device 1222 via second communications network 1224. Finally, second user 1220 can store the information in storage 1226.

SMART Gateway Interface 1250 preferably has profiles of one or both of first user 1210 and second user 1220. For example, when first user 1210 registers as an authorized user of SMART Gateway Interface 1250, a user profile for first user 1210 may be established and stored in storage 1252 associated with SMART Gateway Interface 1250. The user profile may include, for example, the name, address, telephone number, a mobile identification number (MIN) of first user device 1210, and the like. In addition, the user profile can further include additional information of first user 1210 including, for example, various parameters for searching information on computer network 1234. The user profile helps focus each search of information over computer network 1234. In addition, the user profile helps filter out less relevant information obtained during a search. Storage 1252 can further include other information. For example, first user 1210 may store an Internet Protocol (IP) address of storage 1226 associated with second user 1220. Using this IP address, information obtained by first user 1210 may be stored directly in storage 1226, or be transferred from storage 1216 to storage 1226.

SMART Gateway Interface 1250 includes protocol server 1254 and transaction server 1256. The functions of protocol server 1254 and transaction server 1256 are described below.

Figure 13:
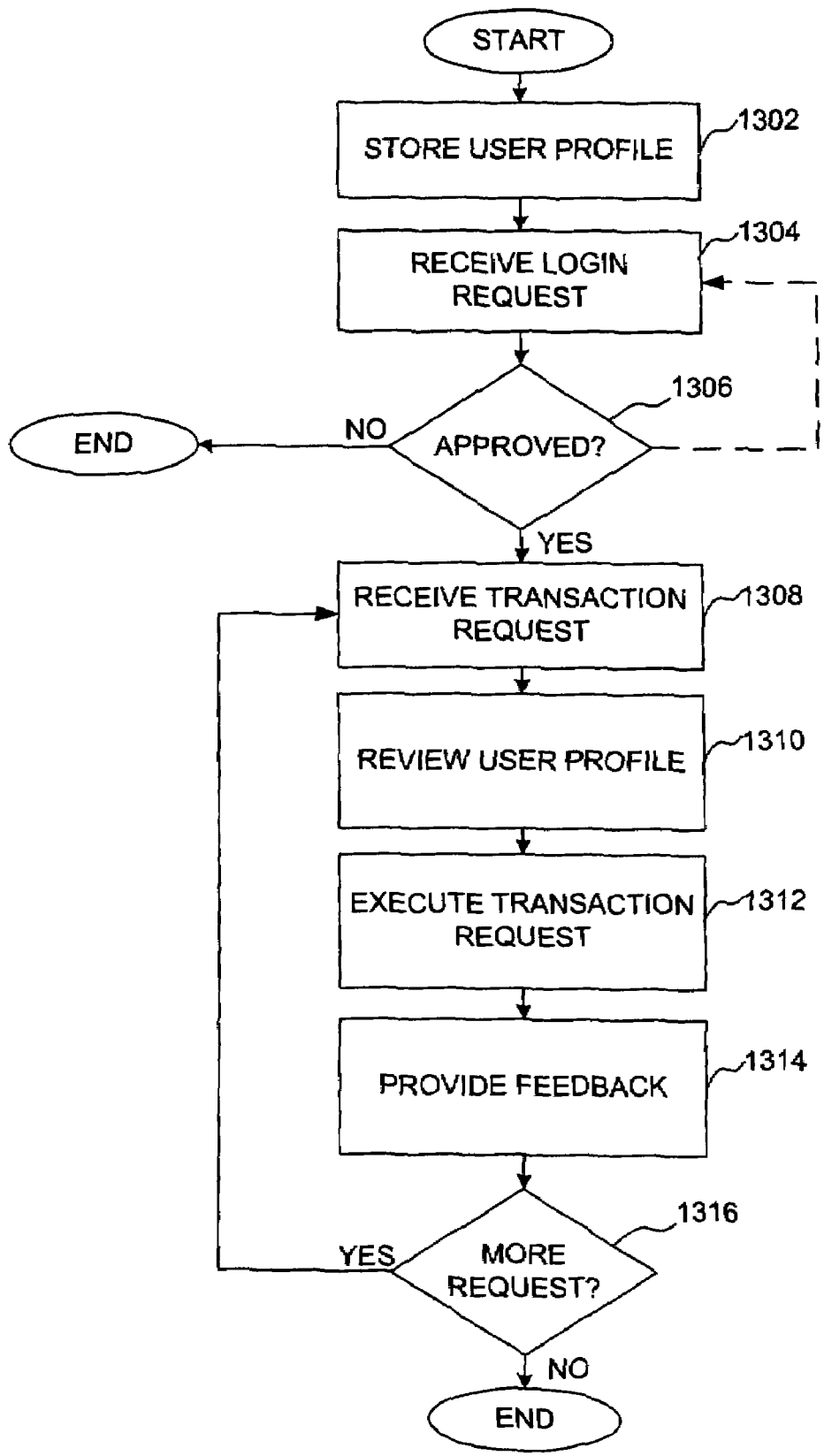
FIG. 13 is a flowchart illustrating exemplary steps that can be used to implement an embodiment of the invention.

FIG. 13 is a flowchart illustrating exemplary steps that could be used to implement an embodiment of the SMART Gateway Service. To explain and illustrate the invention, FIG. 13 is discussed in connection with the structures shown in FIG. 12. The method of FIG. 13, however, is not to be considered as limited to or constrained by the structures of FIG. 12 or any other structure.

In step 1302, user profiles associated with first user 1210 and second user 1220 are stored at SMART Gateway Interface 1250. Preferably, the user profiles are stored in storage 1252, which is accessible to protocol server 1254 and transaction server 1256. The user profiles include identity information, preferences, voice exemplar, and other data related to first user 1210 and second user 1220.

In step 1304, first user 1210 makes a login request to access SMART Gateway Interface 1250. For example, first user 1210 uses first user device 1212 to establish a communications session with SMART Gateway Interface 1250. First user device 1212 can be one of a wireless telephone and first communications network 1214 can be a wireless voice network. Access to SMART Gateway Interface 1250 by first user device 1212 may be initiated, for example, by first user 1210 dialing a telephone number associated with SMART Gateway Interface 1250.

In step 1306, SMART Gateway Interface 1250 determines whether first user 1210 is an authorized user. The determination can be performed in one of several ways. For example, if protocol server 1254 has voice recognition capabilities, protocol server 1254 prompts first user 1210 to identify himself. Preferably, protocol server 1254 includes a voice-enabled platform that has at least two capabilities. First, protocol server 1254 can analyze whether the voice of first user 1210 matches a known voice exemplar of an authorized user that were stored in storage 1252 in step 1302. Second, protocol server 1254 can associate spoken commands provided by first user 1210 with transaction requests, which are then provided by protocol server 1254 to transaction server 1256.

A different authentication method may be employed. For example, one alternative authentication process may involve a wireless telephone (if the wireless telephone is first user device 1212) sending identity information associated with first user 1210 to protocol server 1254. For example, the wireless telephone may send its mobile identification number (MIN) to protocol server 1254. Upon receiving the MIN, protocol server 1254 prompts first user 1210 to provide a password. First user 1210 can enter the password using the keypad of the wireless telephone. First user 1210 is authenticated if the password is associated with the MIN in storage 1252, which is accessible to protocol server 1254. In lieu of the MIN, first user 1210 can enter a user ID to identify himself before providing the password.

In step 1306, if first user 1210 is authenticated as an authorized user by protocol server 1254, the process goes to step 1308. Otherwise, the process ends and first user 1210 is denied access. It is noted that provisions can be made to permit first user 1210 more than one opportunity to login. For example, as shown in FIG. 13 by the dashed arrow connecting step 1306 back to step 1304, after failing one login attempt, first user 1210 may be given another opportunity to return to step 1304 to login. Preferably, no more than three attempts are allowed to ensure security.

In step 1308, SMART Gateway Interface 1250 receives a transaction request from first user 1210. Here, if first user device 1212 is a wireline telephone or a wireless telephone, first user 1210 simply provides a spoken command into first user device 1212. If the spoken command is recognized by SMART Gateway Interface 1250 (through protocol server 1254), a valid transaction request is received by transaction server 1256. For discussion purposes, assume that the spoken command is "Search Pizza Recipe." It must be noted that provisions can be made to enable first user 1210 to enter the command using the keypad of first user device 1212.

In step 1310, transaction server 1256 interfaces with storage 1252 to review the user profile of first user 1210. In this step, transaction server 1256 may learn that first user 1210 is a professional chef from the user profile of first user 1210. In accordance with the user profile, transaction server 1256 processes the transaction request. For example, transaction server 1256 may prepare a search command to limit searches within selected databases or storages associated with gourmet pizzas only. This avoid searches be conducted in generic databases or storages about pizza in general from which the results obtained would not be appreciated by first user 1210.

In step 1312, transaction server 1256 executes the transaction request. As discussed in step 1310, the execution of the transaction request would be in accordance with first user 1210's user profile. In other words, only selected databases or storages will be searched. For example, the execution could limit searches be conducted in storage 1236 instead of other databases or storages.

In step 1314, after results are obtained, SMART Gateway Interface 1250 provides a feedback to first user 1210. The feedback includes the search results based on the execution in step 1312. If first user device 1212 is a telephone, protocol server 1254 would translate any text-based feedback into voice-based feedback. Also, SMART Gateway Interface 1250 may be adapted to summarize the results so that the feedback can be a short sentence. For example, first user 1210 may hear, "The system has found 155 articles related to gourmet pizzas."

In step 1316, if there are more transaction request, the process repeats steps 1308 through 1314. Otherwise, the process ends. For discussion purposes, assume first user wishes to make a second transaction request. For example, after receiving an initial feedback that 155 articles have been found, first user 1210 may, in a second transaction request, say "Store results." In response to the second transaction request, SMART Gateway Interface 1250 stores the results in a database or storage associated with first user 1210. For example, the 150 articles can be stored in storage 1216, from which first user 1210 can review the results at a later time. First user 1210 may review the results stored in storage 1216 using a different communications device such as, for example, a desktop computer.

FIGS. 14 through 17 collectively represent a flowchart that illustrates exemplary steps that could be used to implement a preferred embodiment of the invention.

In step 1402, a user accesses a gateway interface of the invention.

In step 1404, the user selects one of the several transaction types. The transaction types can include, for example, Review, Search, Store, Share. Review means the user wishes to review information that is stored in a database or storage whose identity is known to the user. Search means the user wishes to obtain certain information that is stored in one or more databases or storages using certain search terms provided by the user. The identity of the one or more databases or storages may be known or unknown to the user. Store means the user wishes to store retrieved information in a specific database or storage whose identity is known to the user. Share means the user wishes to share certain information that is stored in a first known database or storage to a second known database or storage.

Figure 14:
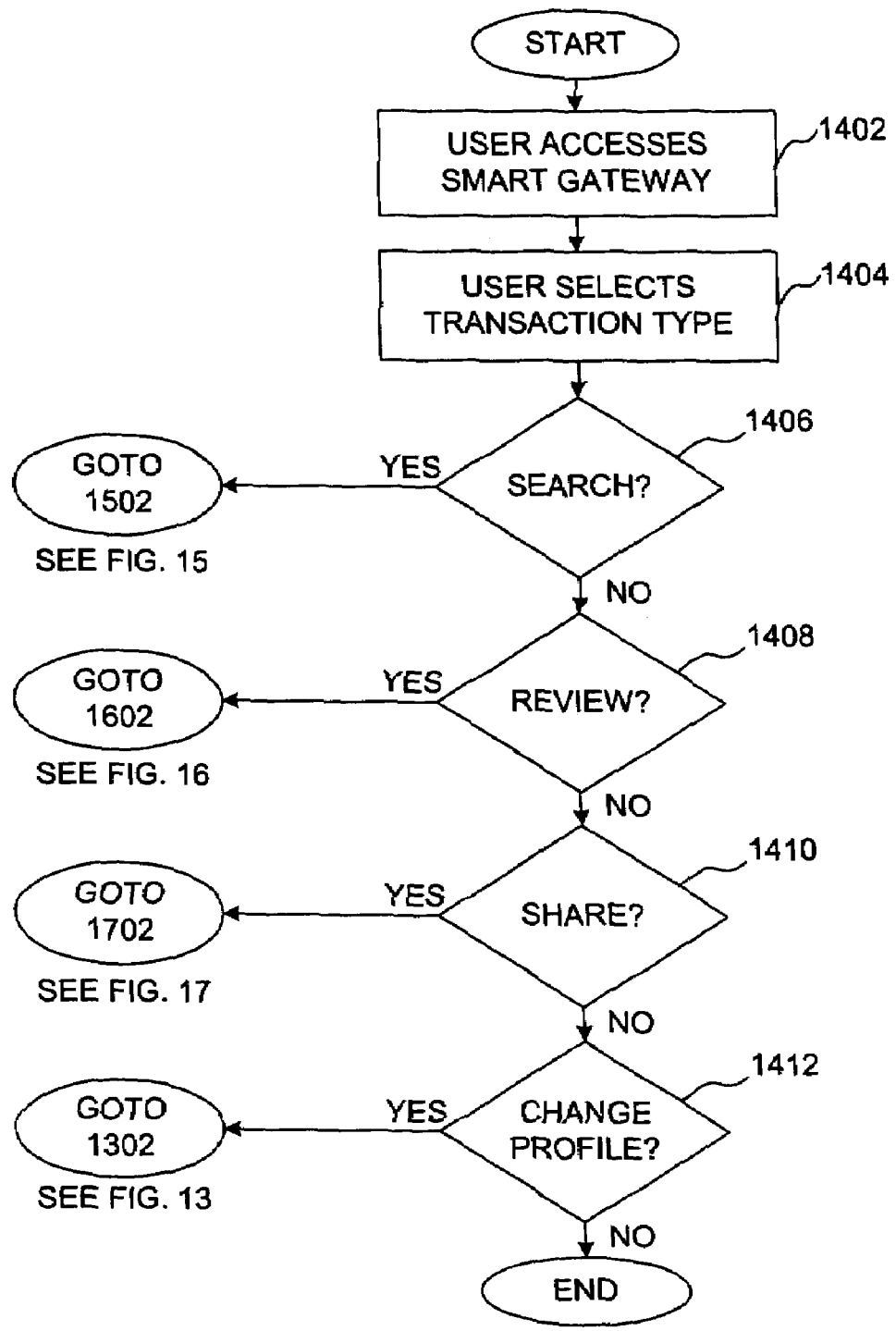
FIGS. 14 through 17 collectively represent a flowchart that illustrates exemplary steps that can be used to implement a preferred embodiment of the invention.

Steps 1406 through 1412 are alternative transactions that can be requested by the user. These steps do not necessarily occur in the order in which they are shown in FIG. 14 or as discussed hereinafter.

Figure 15:
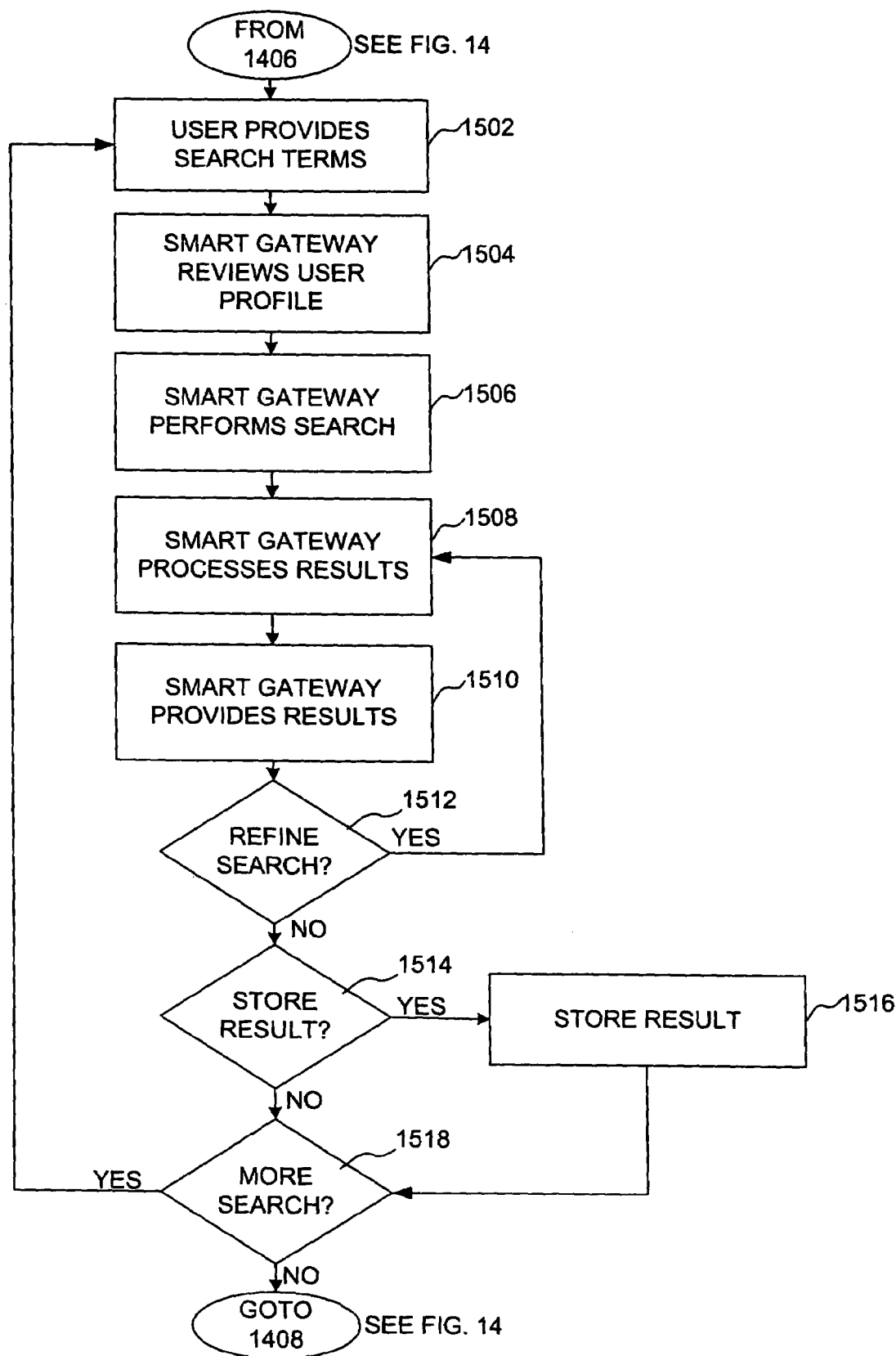

If in step 1406, the user provides a spoken command or otherwise inputs a command associated with the Search function, the process goes to step 1502 (see FIG. 15).

Figure 16:
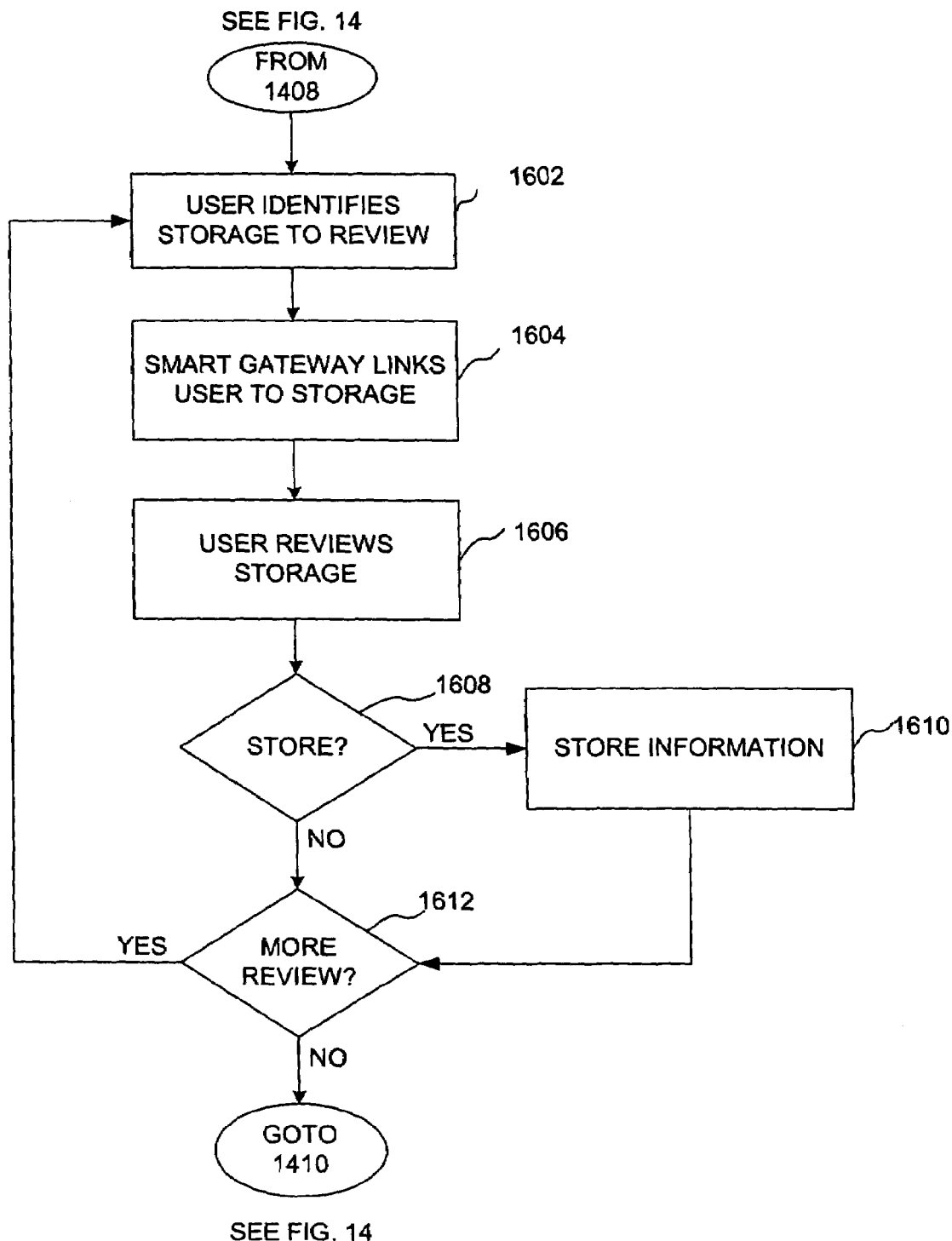

If in step 1408, the user provides a spoken command or otherwise inputs a command associated with the Review function, the process goes to step 1602 (see FIG. 16).

Figure 17:
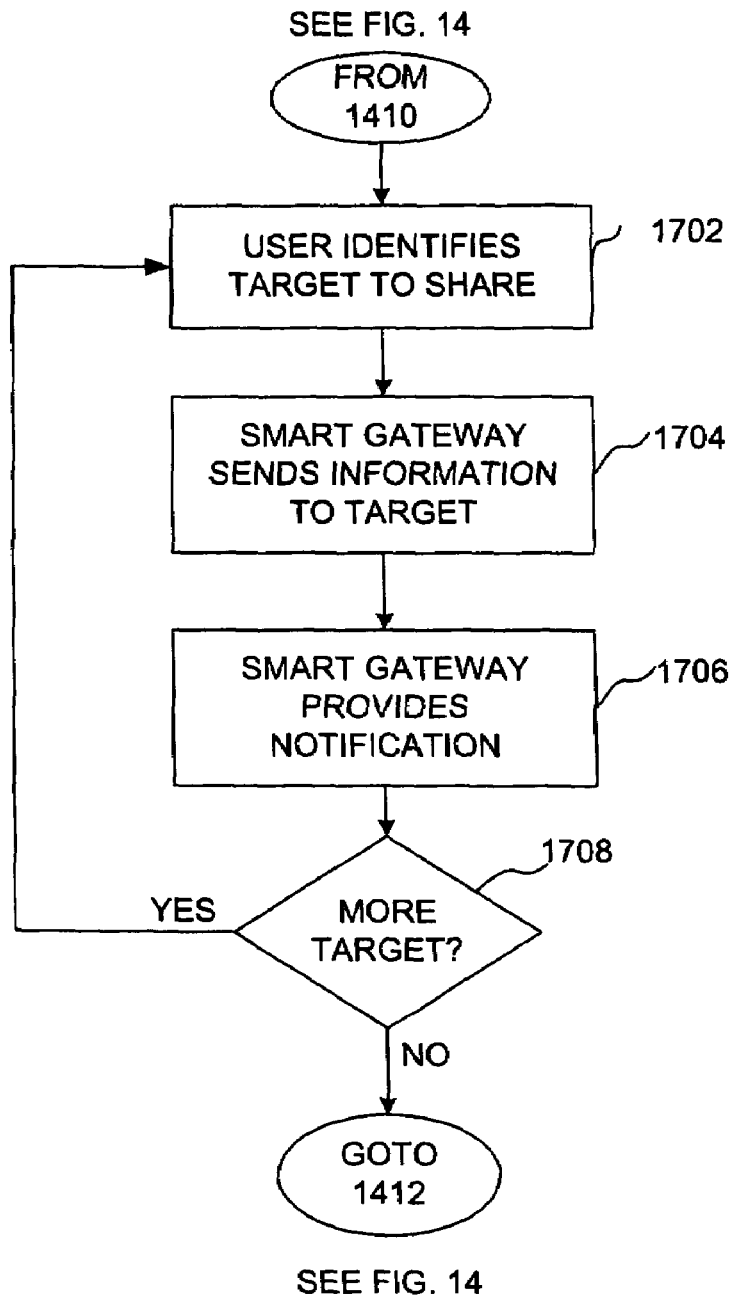

If in step 1410, the user provides a spoken command or otherwise inputs a command associated with the Share function, the process goes to step 1702 (see FIG. 17).

If in step 1412, the user provides a spoken command or otherwise inputs a command associated with the Change Profile function, the process goes to step 1302 (see FIG. 13).

In step 1502, the user provides one or more search terms.

In step 1504, the gateway interface reviews the user's profile.

In step 1506, the gateway interface performs the search in accordance with the search terms and the user profile.

In step 1508, the gateway interface processes the search results in accordance with the user's profile.

In step 1510, the gateway interface provides the results.

In step 1512, the gateway interface asks the user whether the user wishes to refine the search. Here, the user could make a "search within search" by providing additional search, narrowing search terms.

In step 1514, the gateway interface asks the user whether the user wishes to store the results. If so, the process goes to step 1516 in which the results are stored in a default database or storage associated with the user or another database or storage as designated by the user. Otherwise, the process goes directly to step 1518, bypassing step 1516.

In step 1518, if the user wishes to perform more searches, the process repeats steps 1502 through 1516. Otherwise, the process goes to step 1408 in FIG. 14.

In step 1602, the user identifies the proper database or storage in which information is to be reviewed is contained.

In step 1604, the gateway interface links the user to the storage.

In step 1606, the user reviews the information in the storage.

In step 1608, if the user wishes to store the information in his or her own storage, the process goes to step 1610 in which the information is stored in a database or storage associated with the user or a different storage designated by the user. Otherwise, the process goes directly to step 1612, bypassing step 1610.

In step 1612, the gateway interface provides the user additional opportunity to review other information. If the user wishes to do more review, the process repeats steps 1602 through 1610. Otherwise, the process goes to step 1410 in FIG. 14.

In step 1702, the user identifies a target storage or database to share the information.

In step 1704, the gateway interface sends the information to the target storage.

In step 1706, the gateway interface provides notification to the user and another user associated with the target storage that the information has been stored in the target storage.

In step 1708, the gateway interface asks the user whether additional target databases should be receiving the information. If so, the process repeats steps 1702 through 1706. Otherwise, the process goes to step 1412 in FIG. 14.

The foregoing disclosure of the preferred embodiments of the invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

Further, in describing representative embodiments of the invention, the specification may have presented the method and/or process of the invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the invention should not be limited to the performance of their steps in the order written, and one skilled in the art can readily appreciate that the sequences may be varied and still remain within the spirit and scope of the invention.

What is claimed is:

1. A method for creating new communications services comprising:
    analyzing mobility, speed and bandwidth interactions among two or more disparate communication networks;
    analyzing a plurality of communication applications, each communication application being analyzed to assess its capability to build scalable core engines, its capability to support multiple user applications across a plurality of industries and its capability to be executed on a plurality of communication device models;
    analyzing the plurality of communication device models from one or more preferred suppliers, each preferred supplier possessing a market share greater than 10% and a possessing a demonstrated ability to predict mass market adoption probabilities;
    surveying customer desires associated with a search function for content accessible over the two or more disparate communication networks;
    surveying customer desires associated with a share function for sharing the content with another user over the two or more disparate communication networks;
    surveying customer desires associated with a store function for storing the content in a location on the two or more disparate communication networks and which is accessible by the customer and at least a second user at a later time; and
    creating a communications service based on results of the analyzing and surveying by:
        identifying the interaction impact on the search, store and share functions resulting from combinations of the two or more disparate communication networks and each of the plurality of communication device models,
        identifying the interaction impact on the search, store and share functions resulting from combinations of each of the plurality of communication device models and each of the plurality of communication applications,
        identifying the interaction impact on the search, store and share functions from combinations of each of the plurality of communication applications and each of the two or more disparate communication networks, and
        integrating the two or more disparate networks to provide at least the search, store and share functions to a selection of the plurality of communication devices models from the preferred suppliers via a selection of the plurality of communication applications,
    wherein the communications service is one of a SMART Search Service, a SMART Share Service, a SMART Store Service, a SMART Wait Service, a SMART Filter Service, a SMART Communications Service, a SMART Wireless LAN Service, a SMART Access Service, and a SMART Gateway Service.

2. The method of claim 1, wherein the two or more disparate communication networks include at least one of a wireless and a wireline network.

3. The method of claim 1, wherein the plurality of communication device models includes at least one of a computer and a wireless communication device.

4. The method of claim 1, wherein the communications service includes at least two communications networks.

* * * * *